(12) United States Patent
Masuda

(10) Patent No.: US 11,108,988 B2
(45) Date of Patent: Aug. 31, 2021

(54) TRANSMITTER AND TRANSMISSION METHOD AND RECEIVER AND RECEPTION METHOD

(71) Applicant: SONY SEMICONDUCTOR SOLUTIONS CORPORATION, Kanagawa (JP)

(72) Inventor: Takashi Masuda, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/625,846

(22) PCT Filed: Jun. 19, 2018

(86) PCT No.: PCT/JP2018/023226
§ 371 (c)(1),
(2) Date: Dec. 23, 2019

(87) PCT Pub. No.: WO2019/009060
PCT Pub. Date: Jan. 10, 2019

(65) Prior Publication Data
US 2020/0128207 A1    Apr. 23, 2020

(30) Foreign Application Priority Data
Jul. 3, 2017    (JP) .............................. JP2017-130347

(51) Int. Cl.
*H04N 5/63*    (2006.01)
*H04N 5/04*    (2006.01)
(Continued)

(52) U.S. Cl.
CPC ................. *H04N 5/63* (2013.01); *H04N 5/04* (2013.01); *H04N 5/38* (2013.01); *H04N 5/44* (2013.01)

(58) Field of Classification Search
CPC .. H04N 5/63; H04N 5/04; H04N 5/38; H04N 5/44
See application file for complete search history.

(56) References Cited

U.S. PATENT DOCUMENTS 8,650,429 B1 * 2/2014 Starr ................ H03K 19/01837
713/400
2002/0023239 A1    2/2002 Nomura et al.
(Continued)

FOREIGN PATENT DOCUMENTS

EP    1176752 A2    1/2002
JP    61-109338 A    5/1986
(Continued)

OTHER PUBLICATIONS

International Search Report and Written Opinion of PCT Application No. PCT/JP2018/023226, dated Sep. 11, 2018, 10 pages of ISRWO.

*Primary Examiner* — Ajay Cattungal
(74) *Attorney, Agent, or Firm* — Chip Law Group

(57) ABSTRACT

The present disclosure relates to a transmitter and a transmission method and a receiver and a reception method that make it possible to suppress an increase in power consumption. Data in which a clock signal is embedded is transmitted, and a frequency of the clock signal embedded in the data is controlled to reduce the frequency of the clock signal in a predetermined period. Alternatively, data in which a clock signal is embedded and a notification indicating that a frequency of the clock signal is variable are received, and a frequency of the received data is reduced in a predetermined period, on the basis of the received notification. The present disclosure is applicable to, for example, a transmitter, a receiver, a signal processor, a controller, an information transfer system, a transmission method, a reception method, a program, or the like.

19 Claims, 27 Drawing Sheets

(51) Int. Cl.
*H04N 5/38* (2006.01)
*H04N 5/44* (2011.01)

(56) References Cited

U.S. PATENT DOCUMENTS

| | | | |
|---|---|---|---|
| 2007/0127761 A1* | 6/2007 | Poulsen | H04R 3/00 381/355 |
| 2011/0205196 A1* | 8/2011 | Okuno | G09G 3/3674 345/204 |
| 2012/0063534 A1* | 3/2012 | Lin | H04L 7/0091 375/295 |
| 2016/0125840 A1* | 5/2016 | Oh | G09G 5/008 345/213 |
| 2017/0111071 A1 | 4/2017 | Yoo et al. | |

FOREIGN PATENT DOCUMENTS

| | | |
|---|---|---|
| JP | 2002-108490 A | 4/2002 |
| JP | 2002-223204 A | 8/2002 |
| JP | 2008-109589 A | 5/2008 |
| JP | 2014-522204 A | 8/2014 |
| KR | 10-2017-0044969 A | 4/2017 |

* cited by examiner

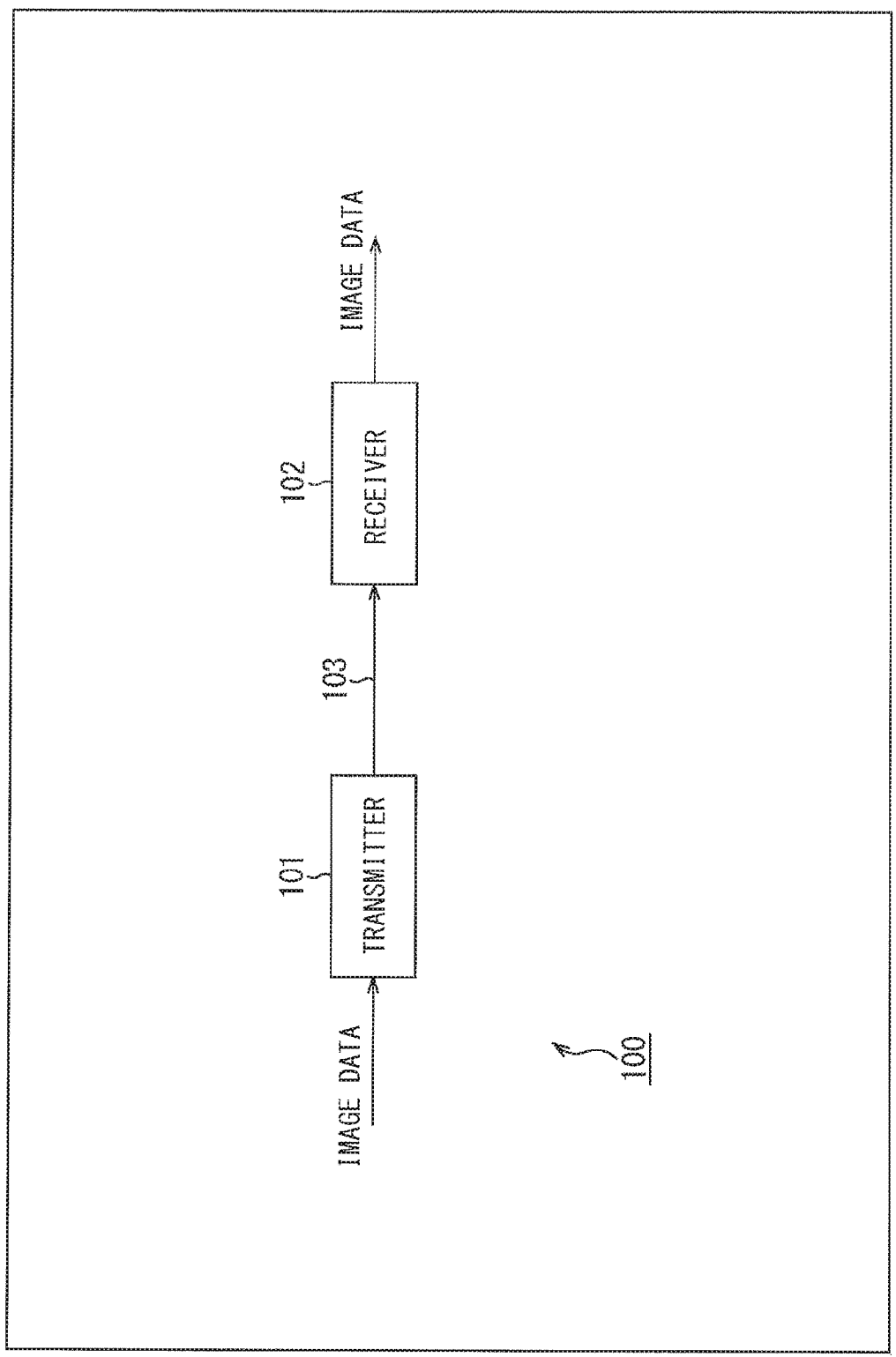
[FIG. 1]

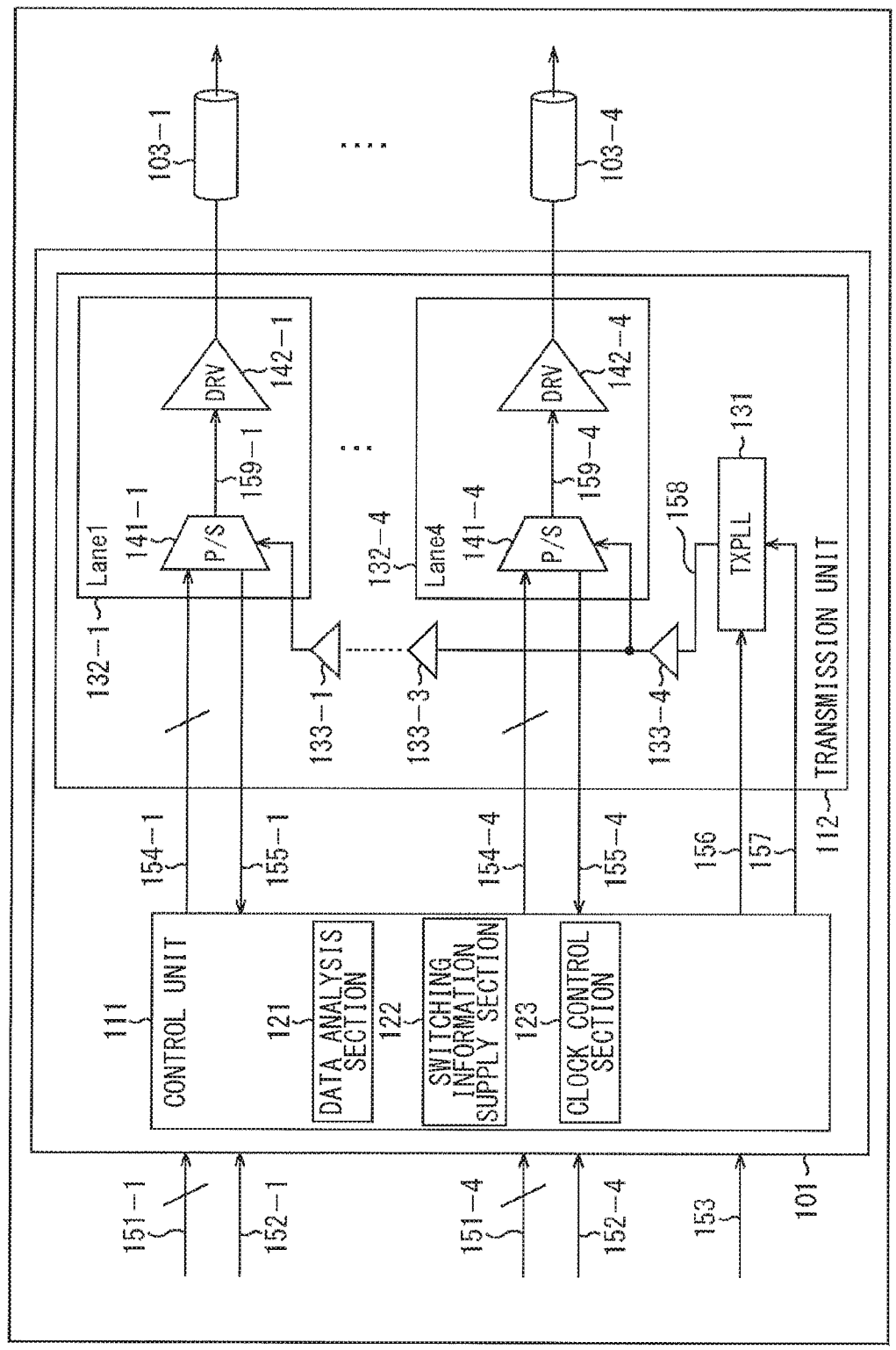
[FIG. 2]

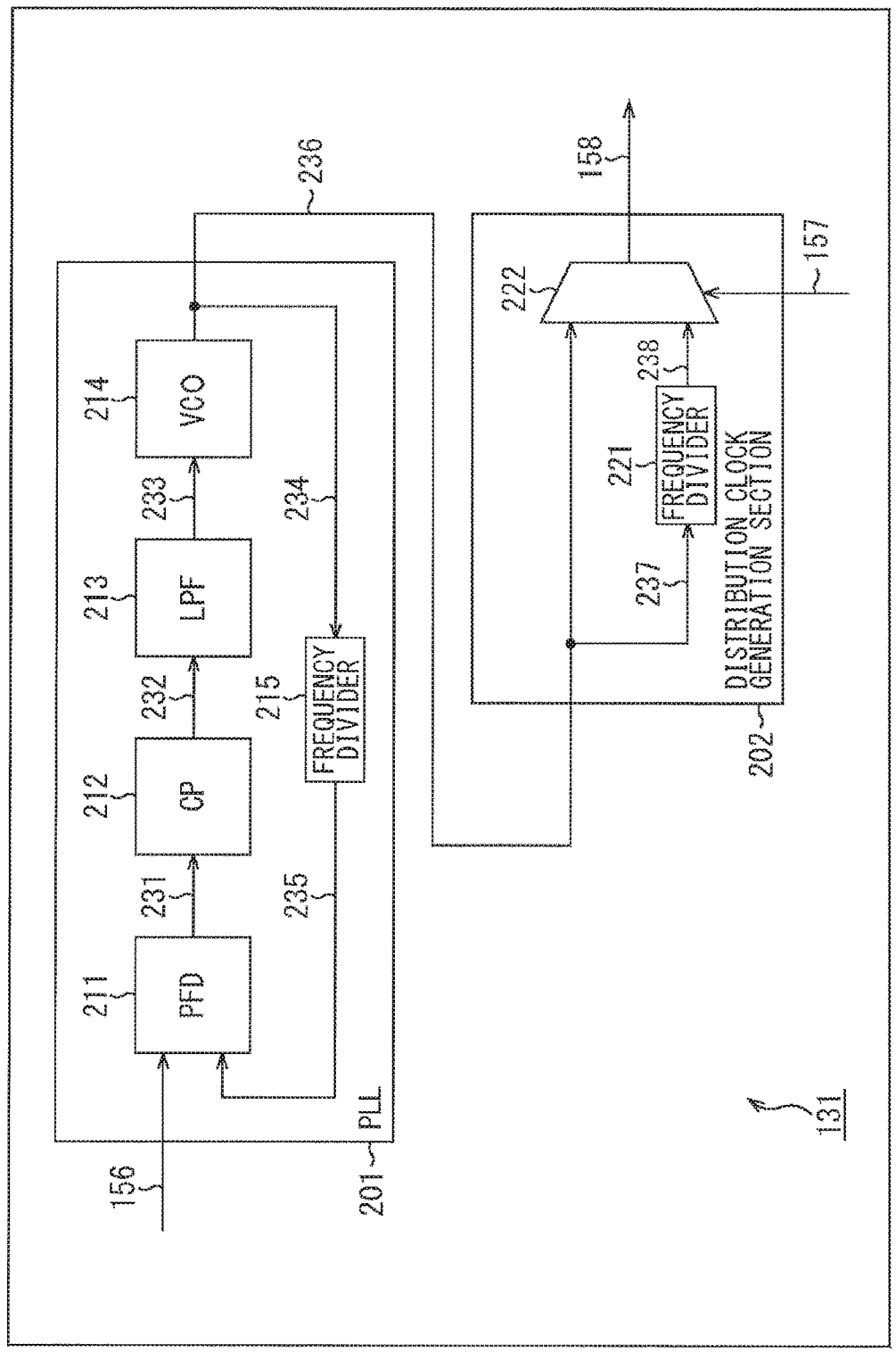
[FIG. 3]

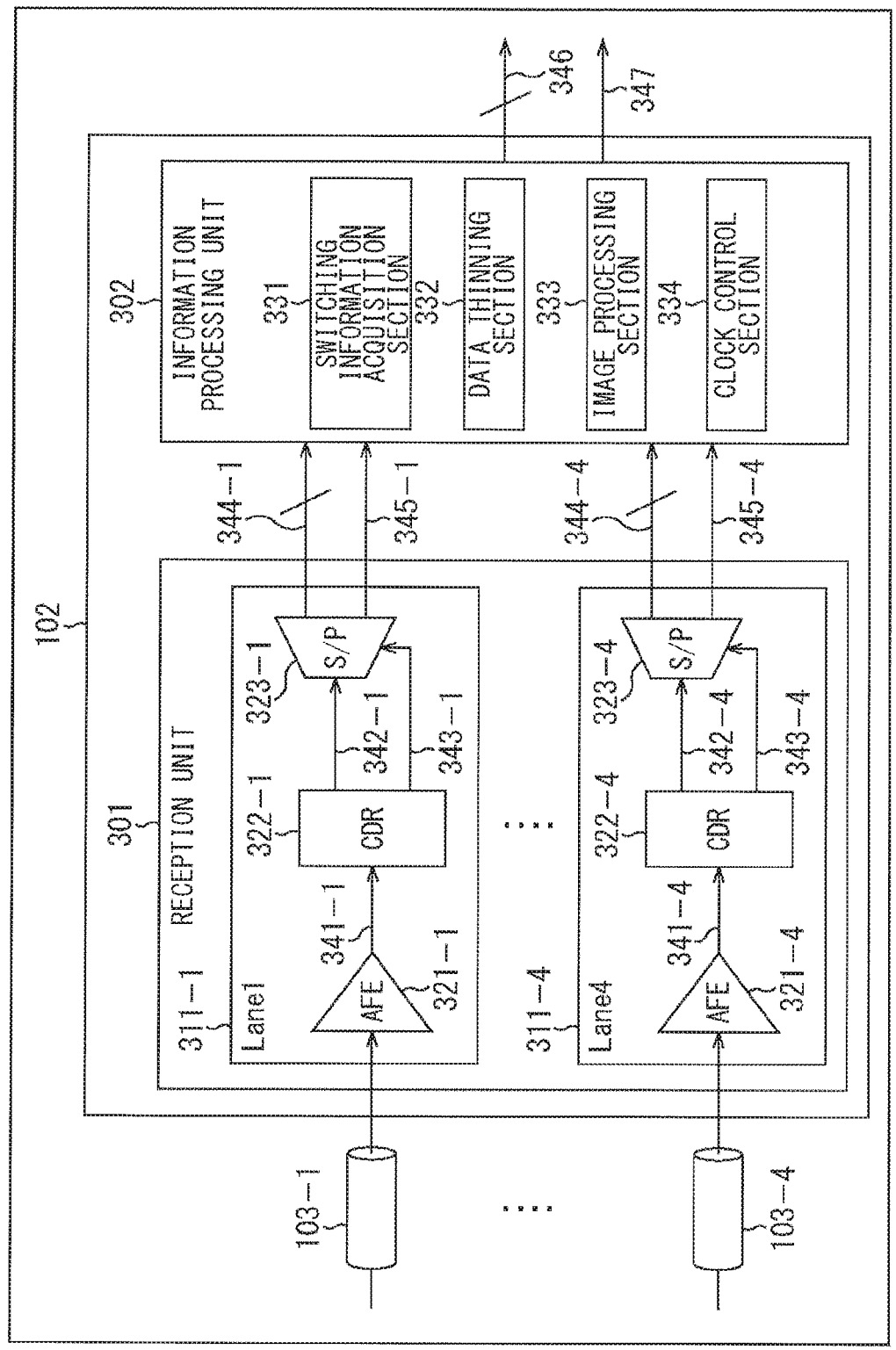

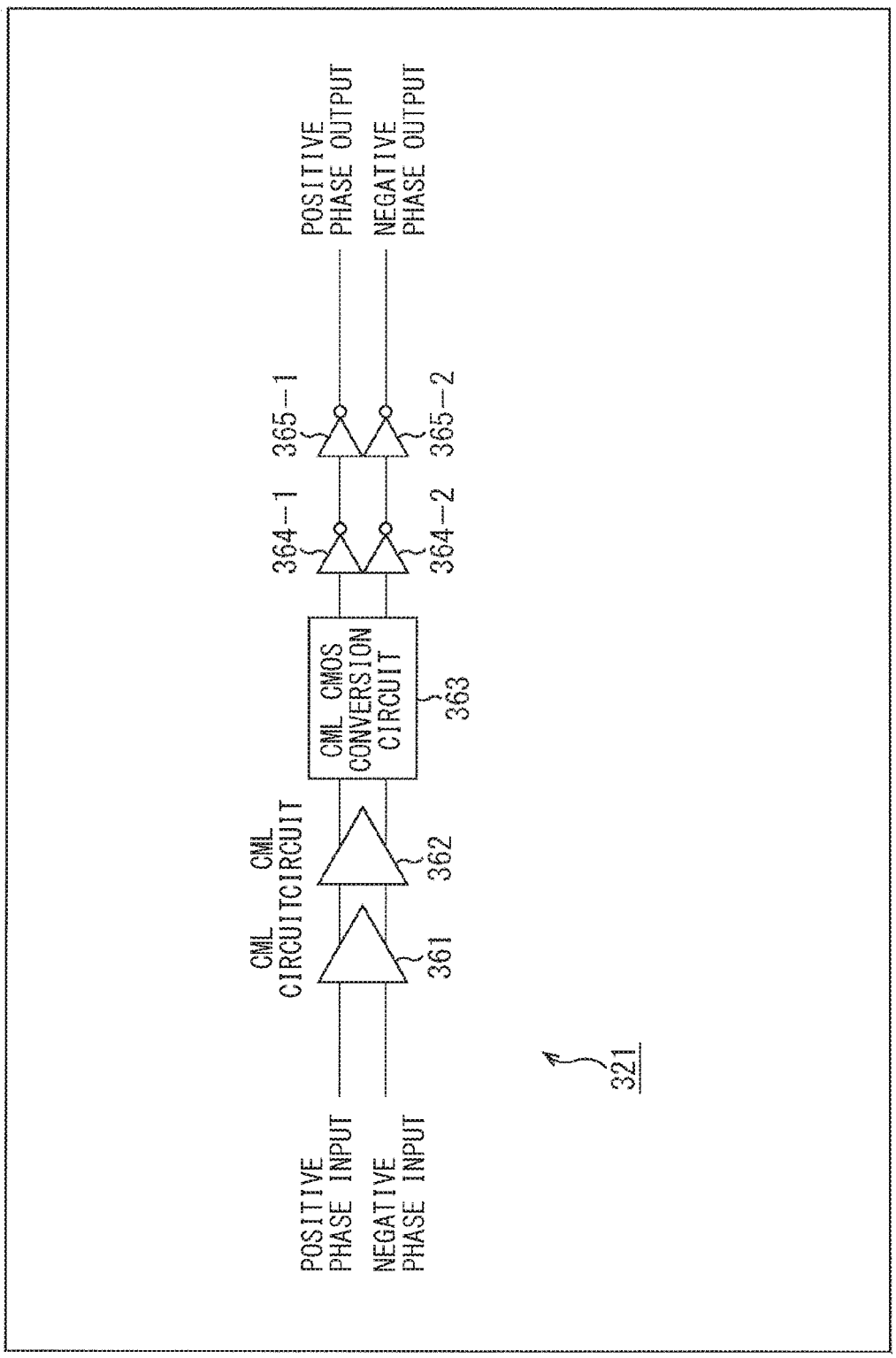
[FIG. 5]

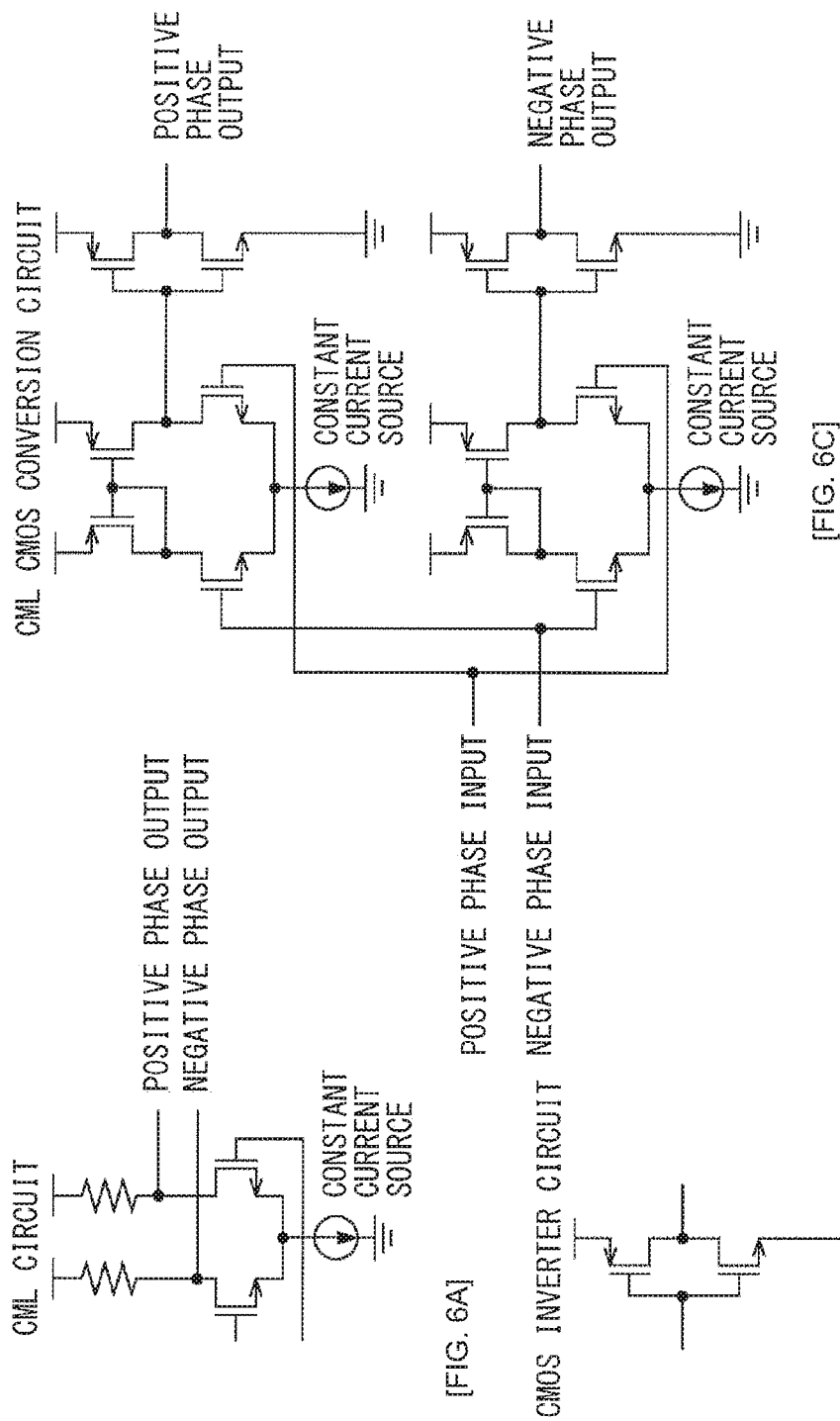

[FIG. 7]
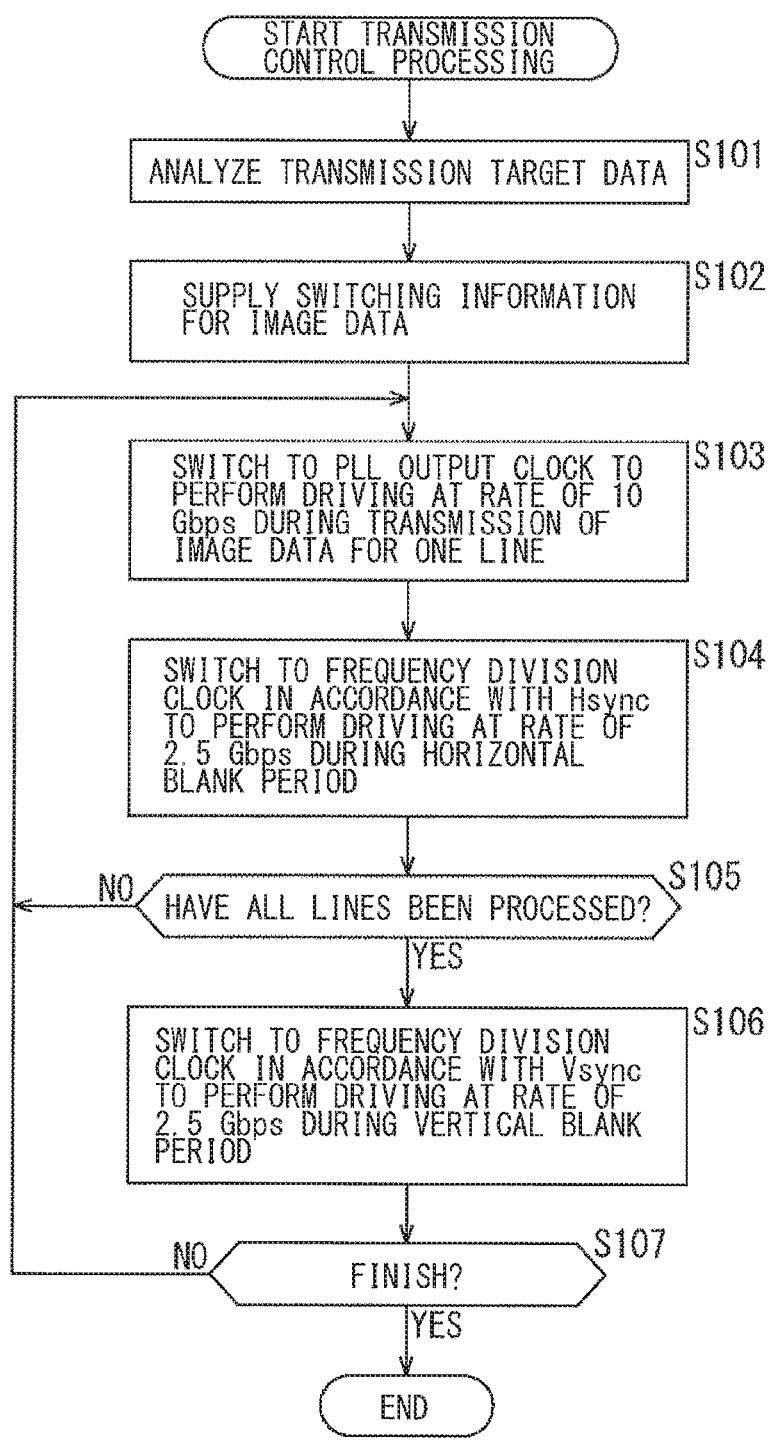

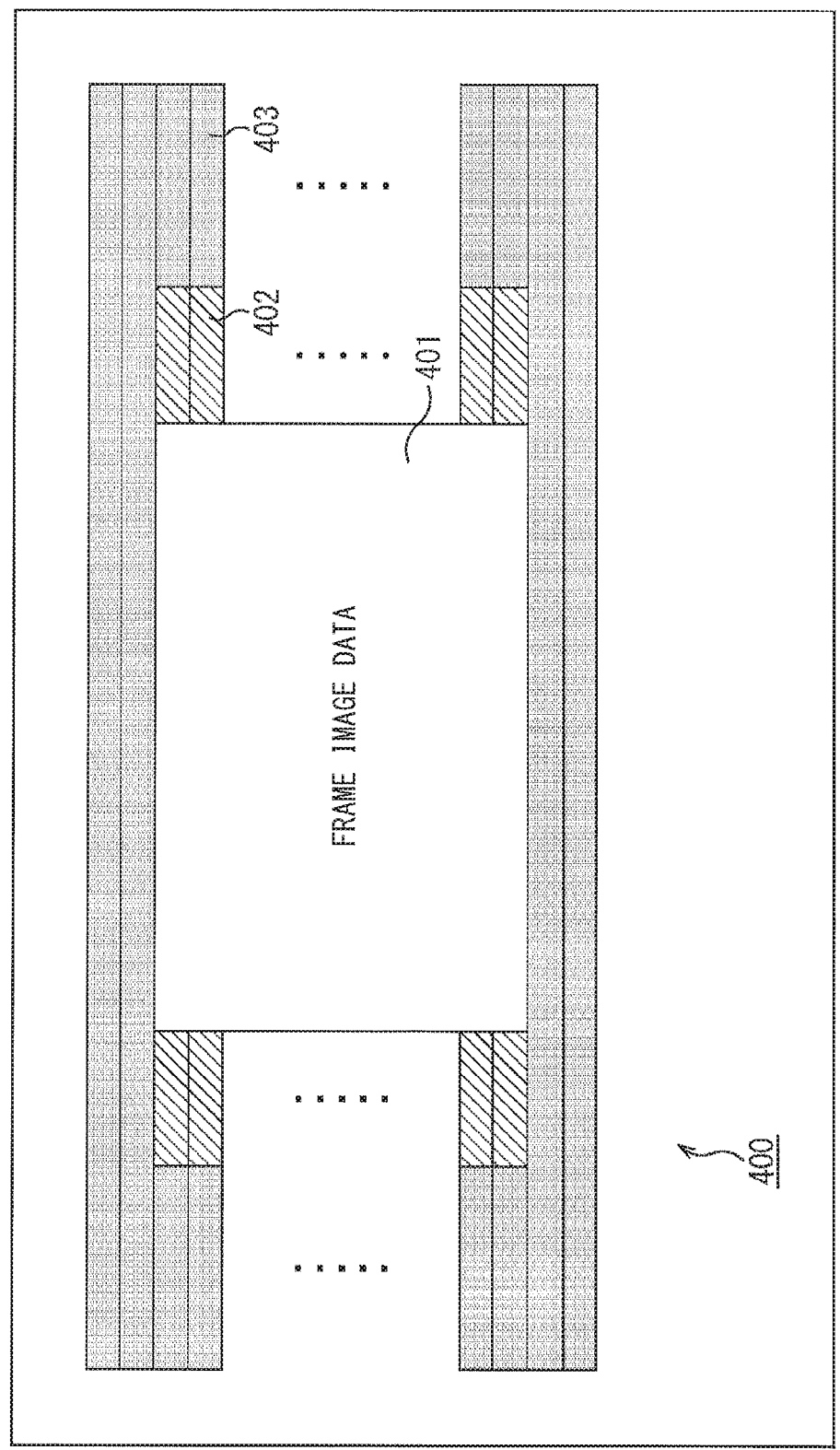
[FIG. 8]

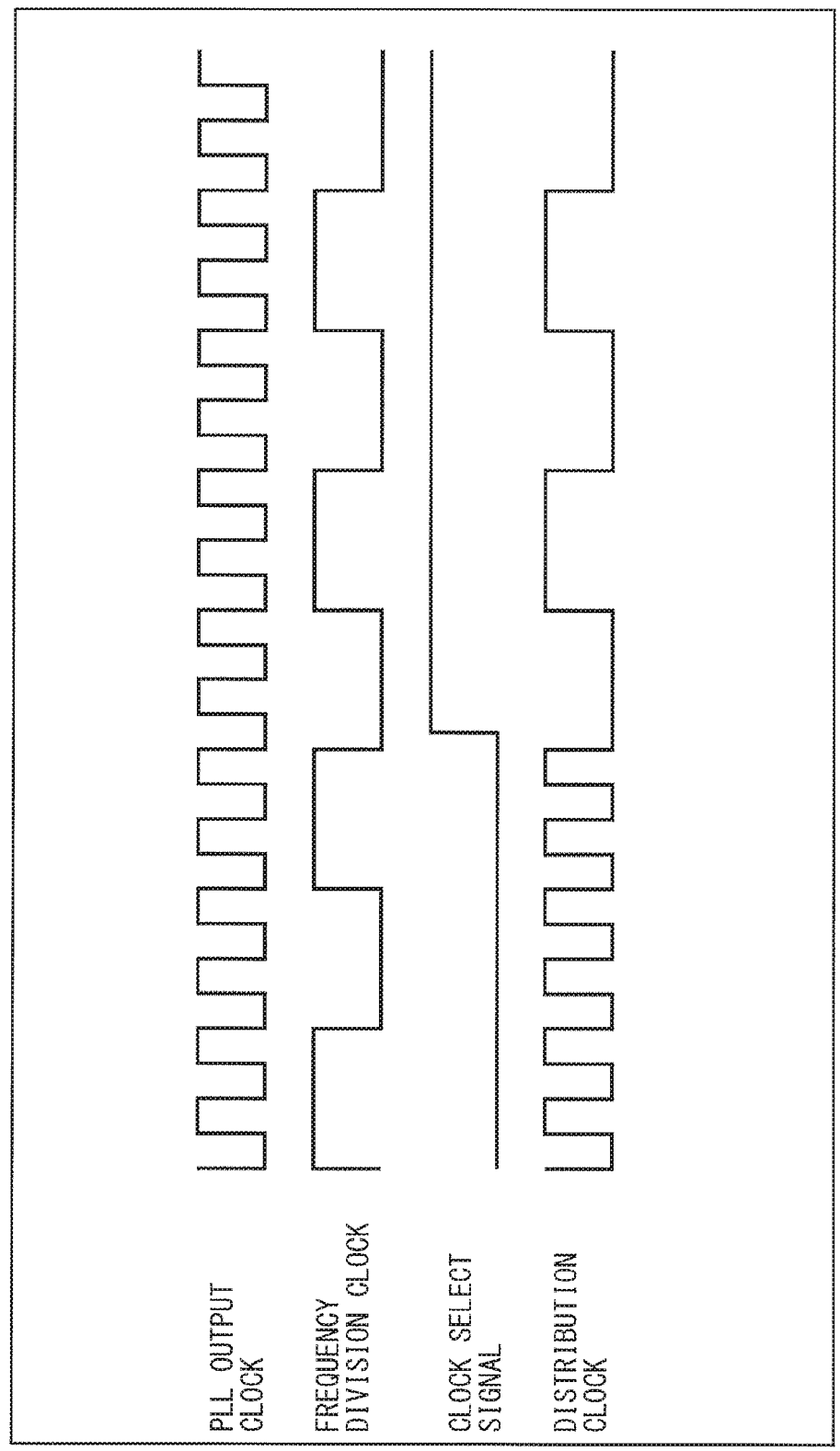
[FIG. 9]

[FIG. 10]
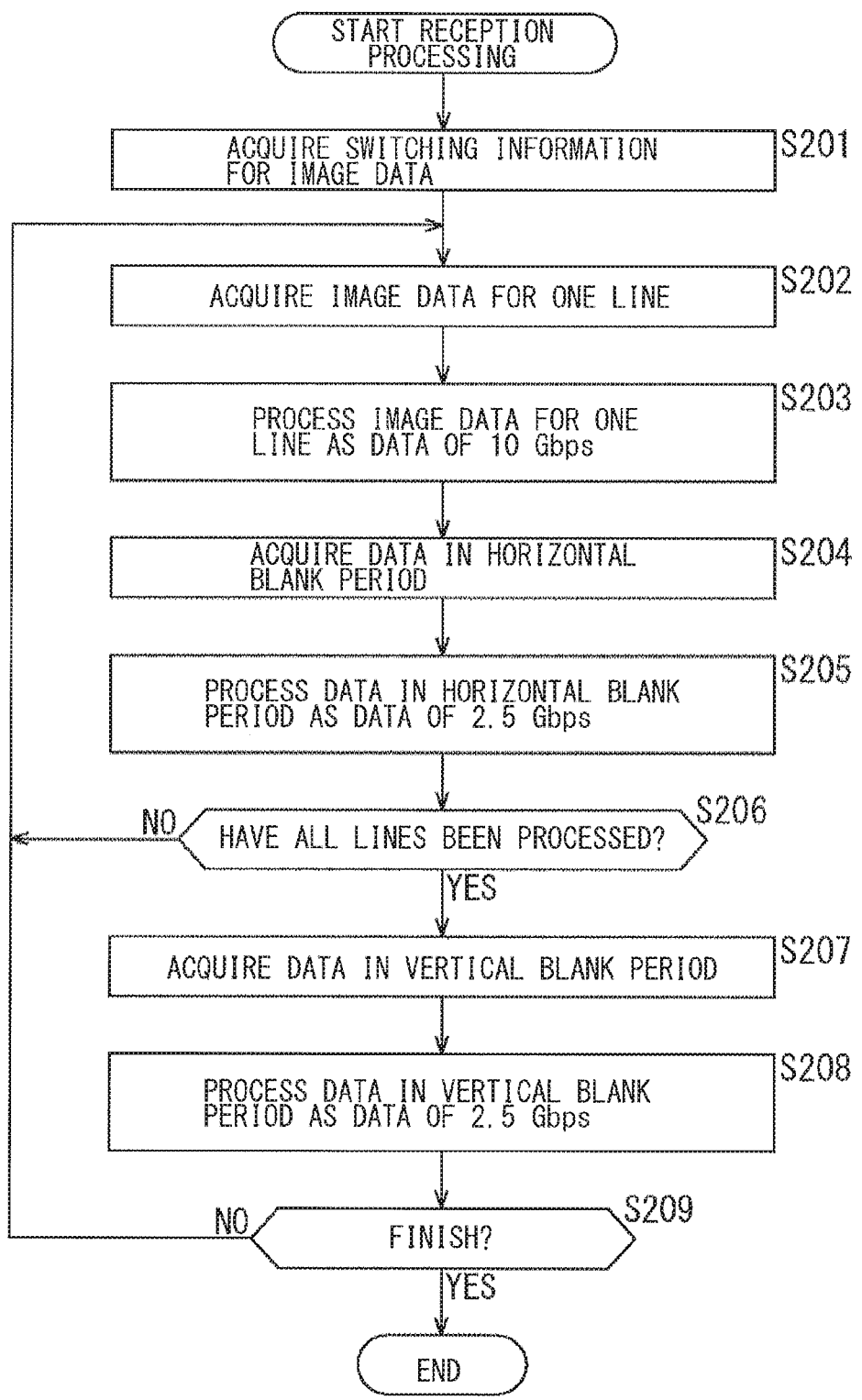

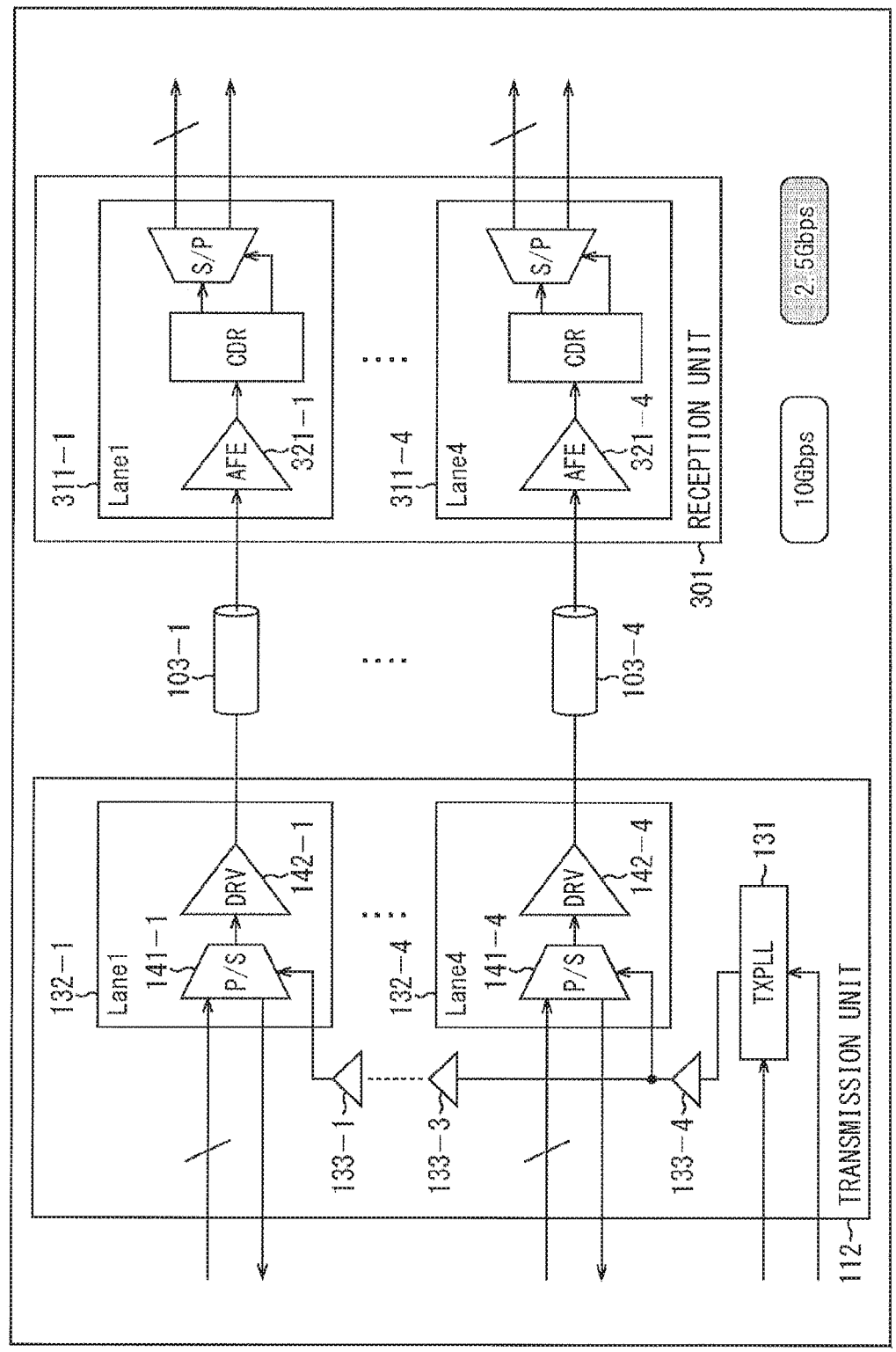
[FIG. 11]

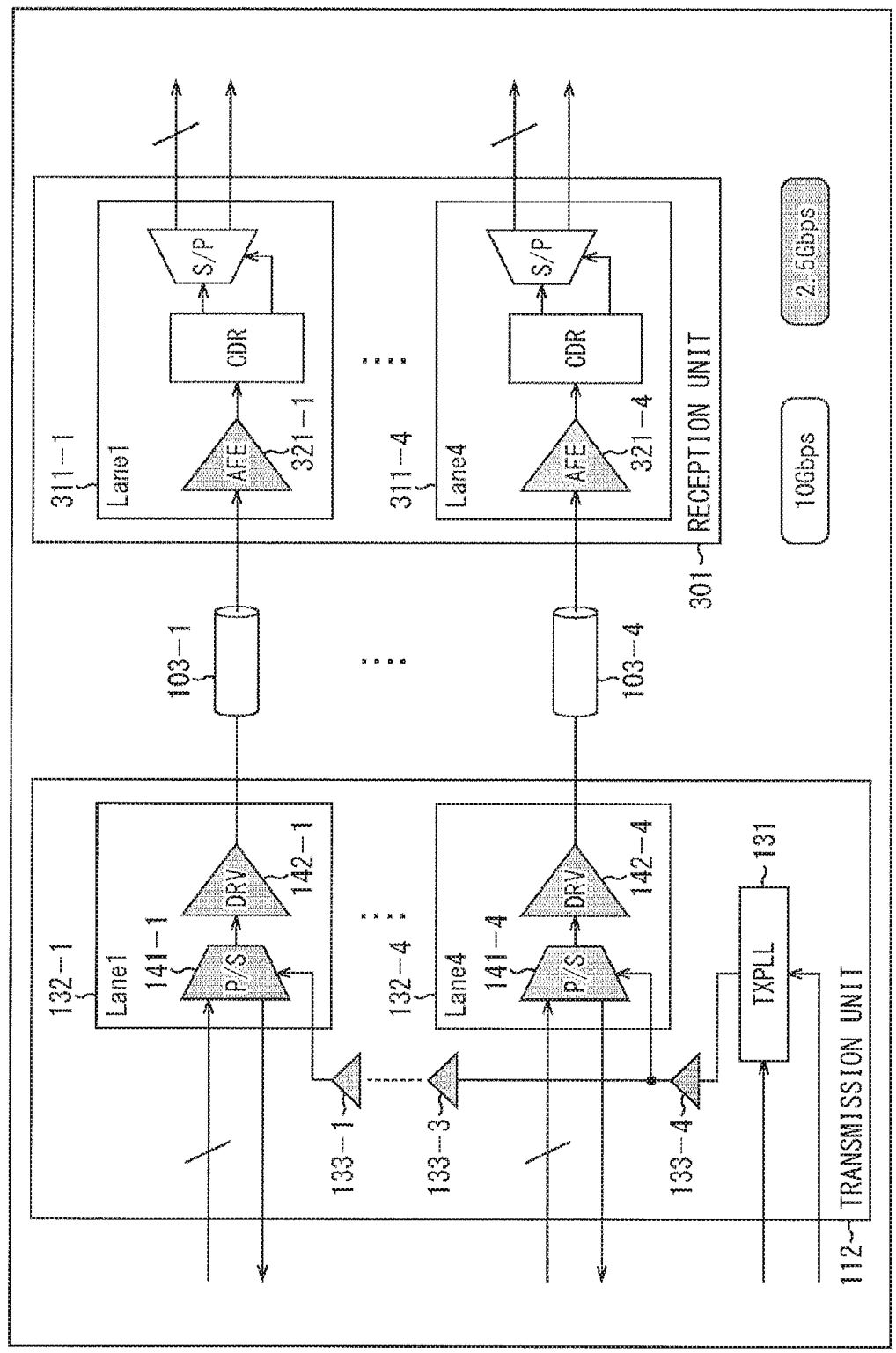
[FIG. 12]

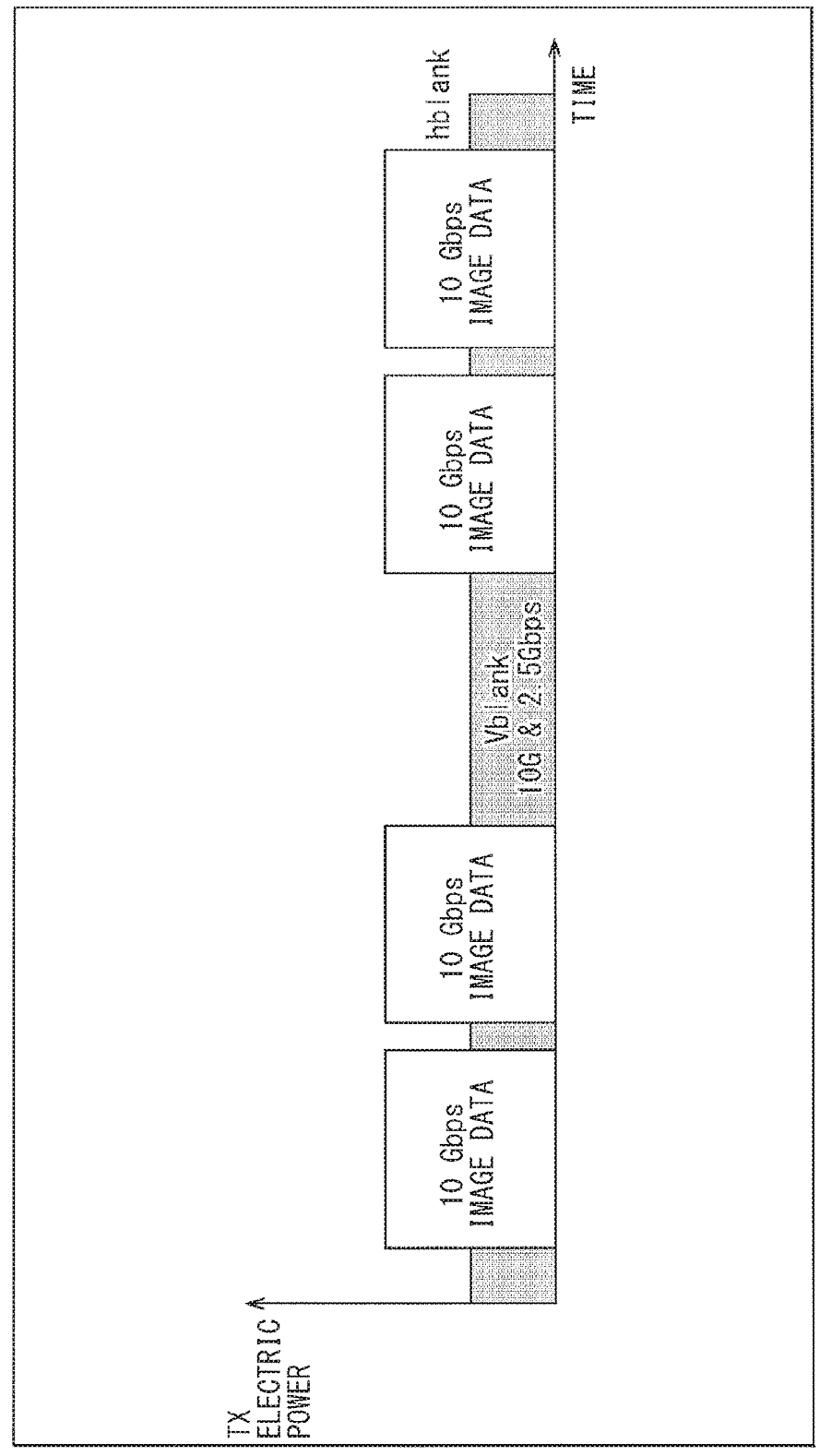
[FIG. 13]

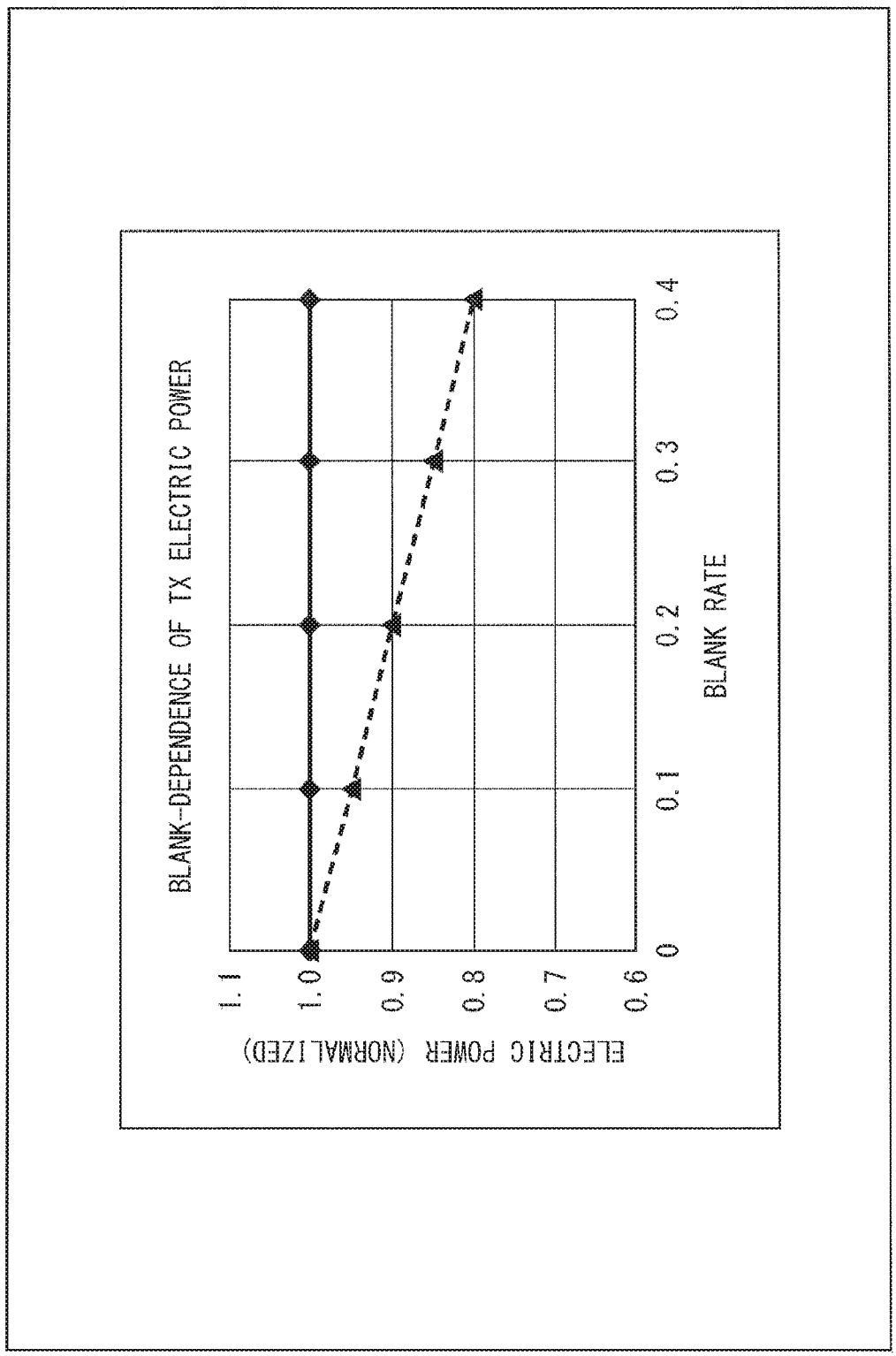
[FIG. 14]

[FIG. 15]
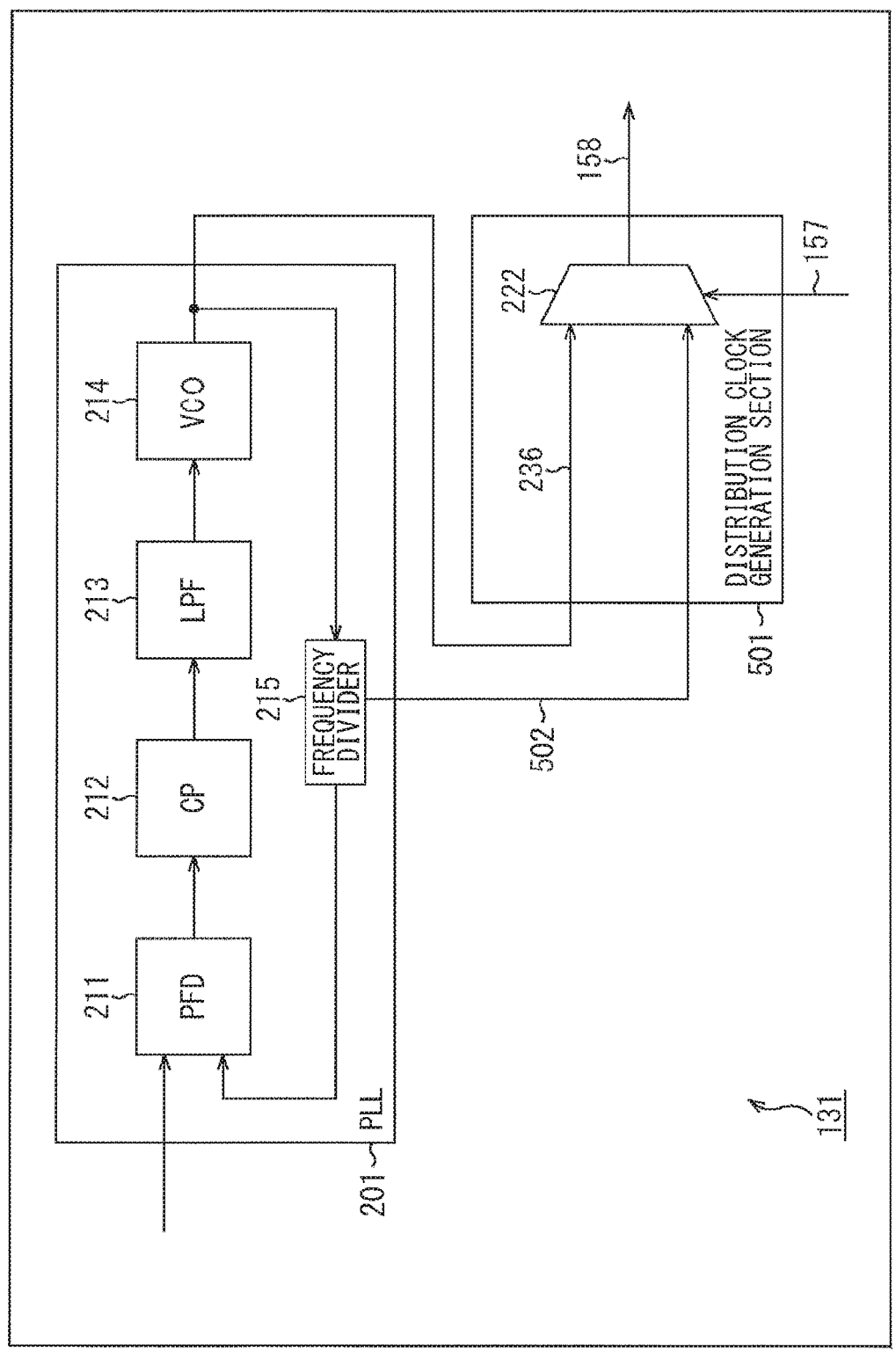

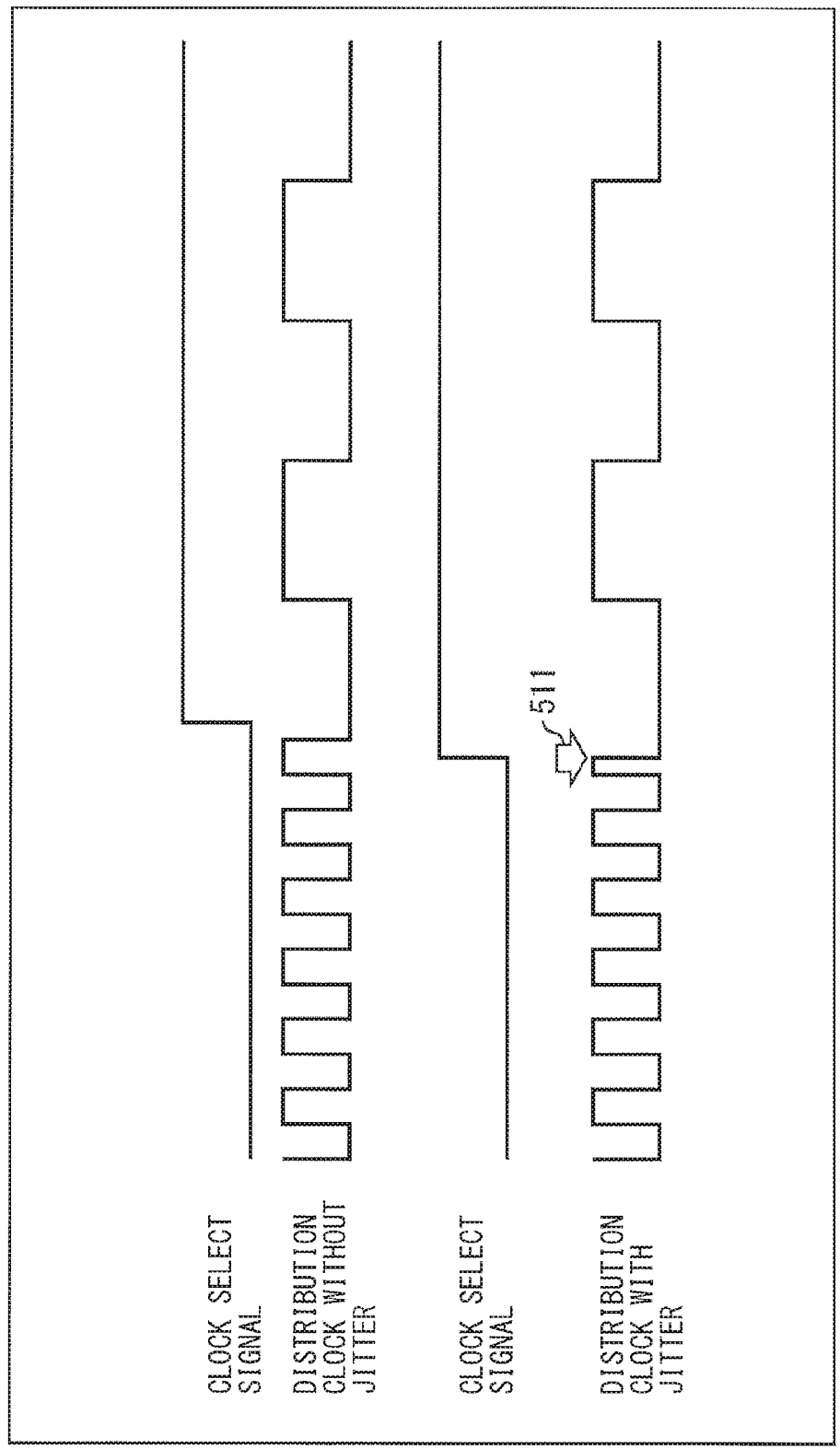

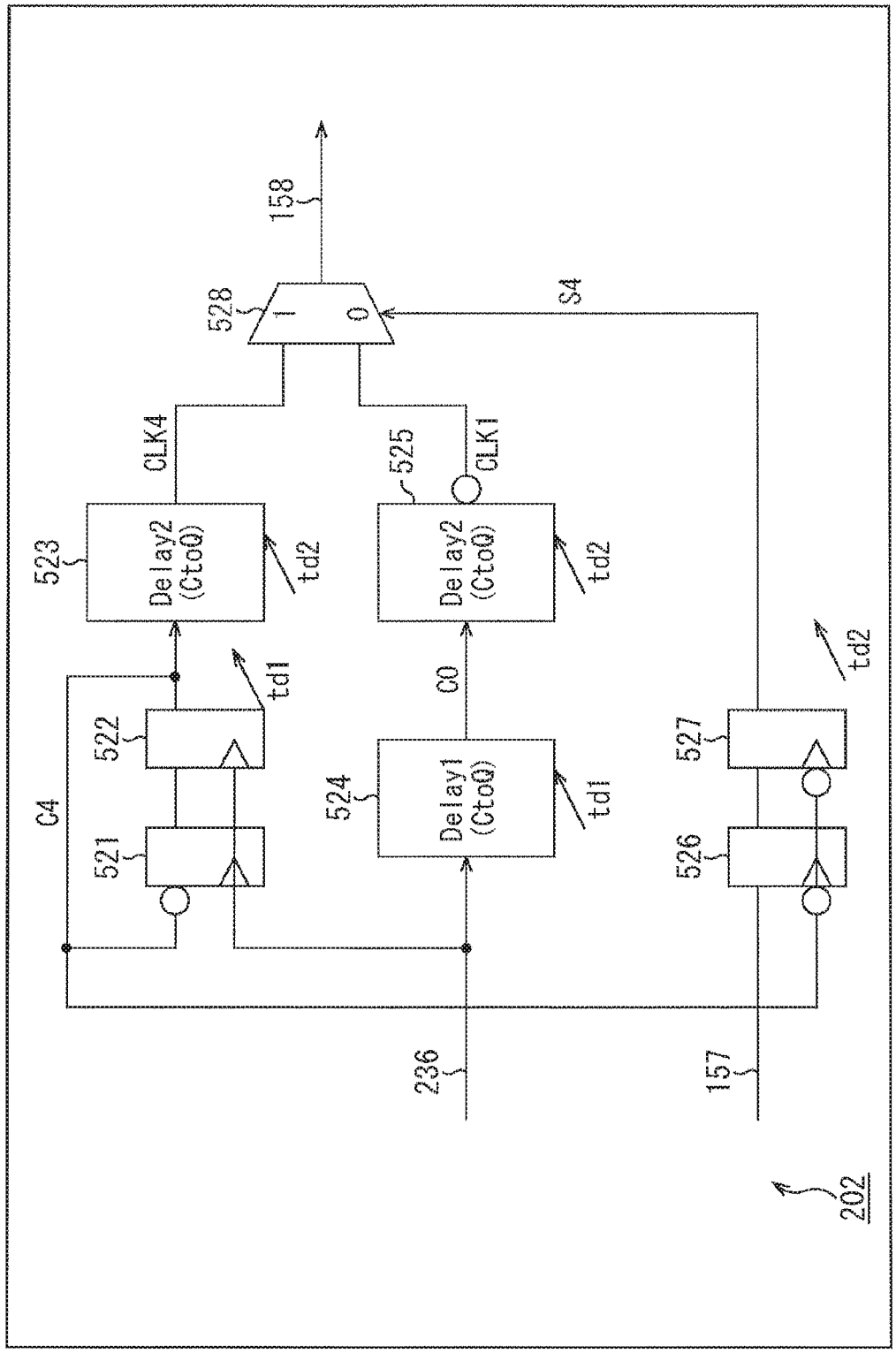
[FIG. 17]

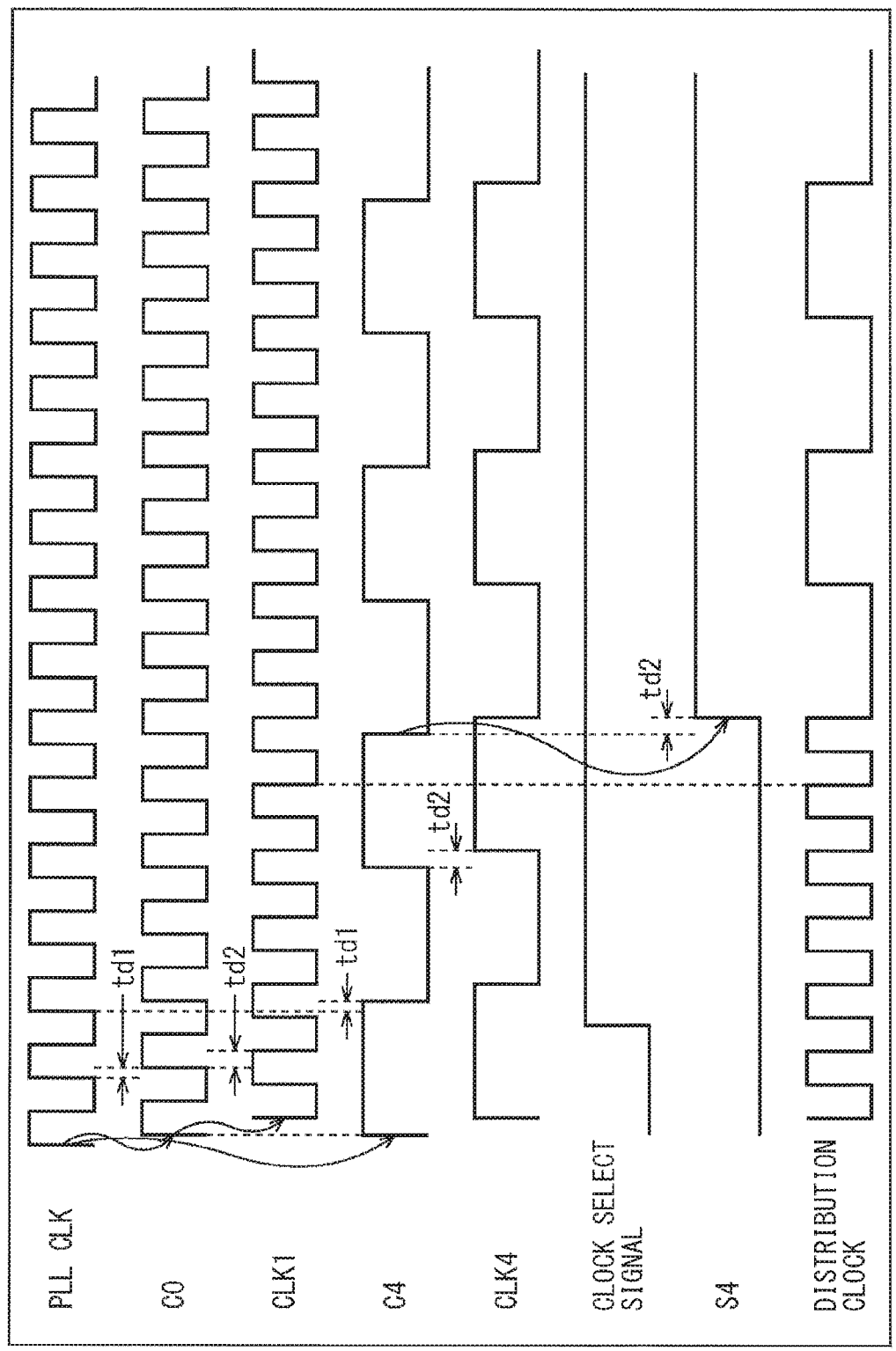
[FIG. 18]

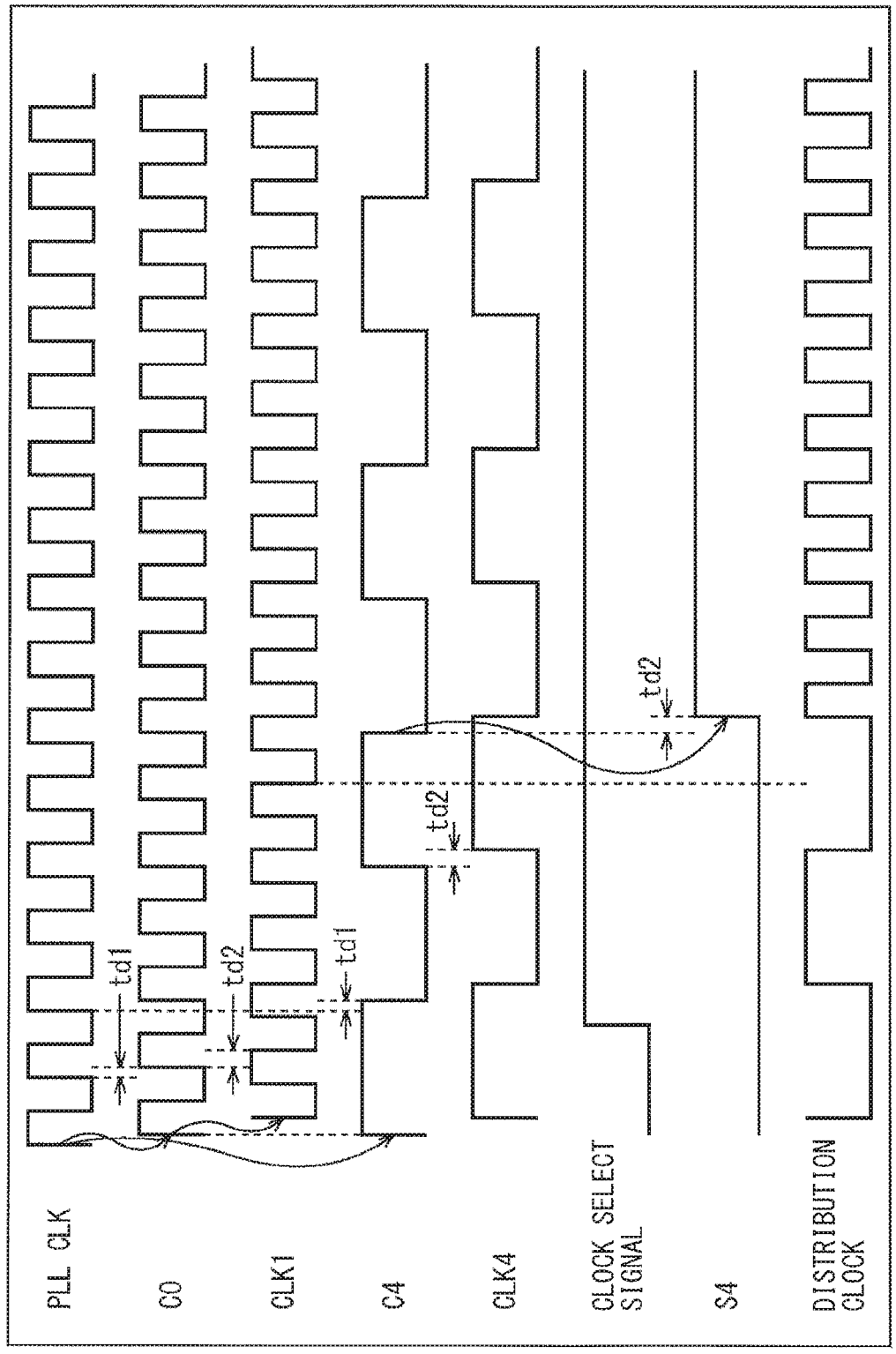

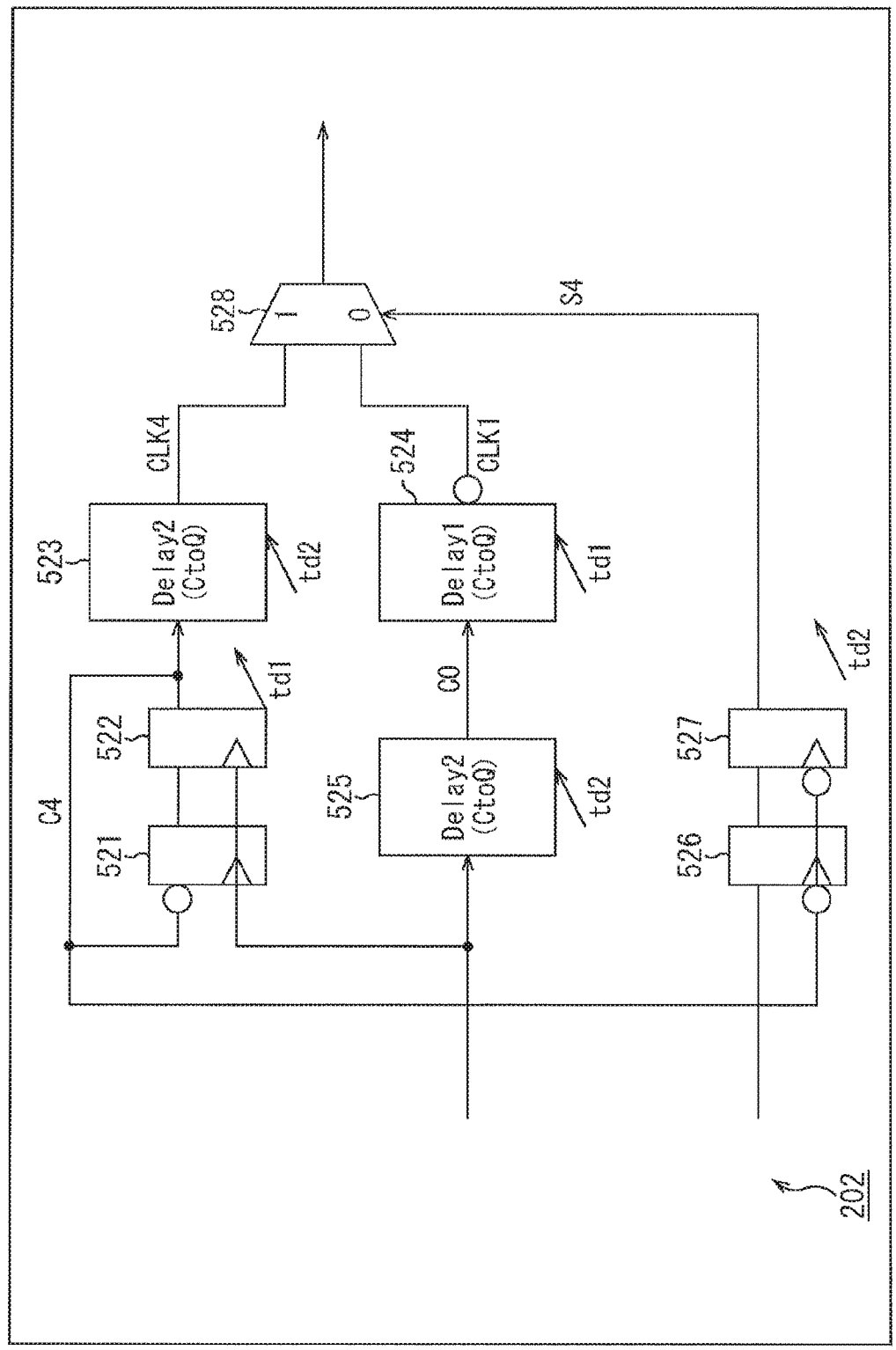
[FIG. 20]

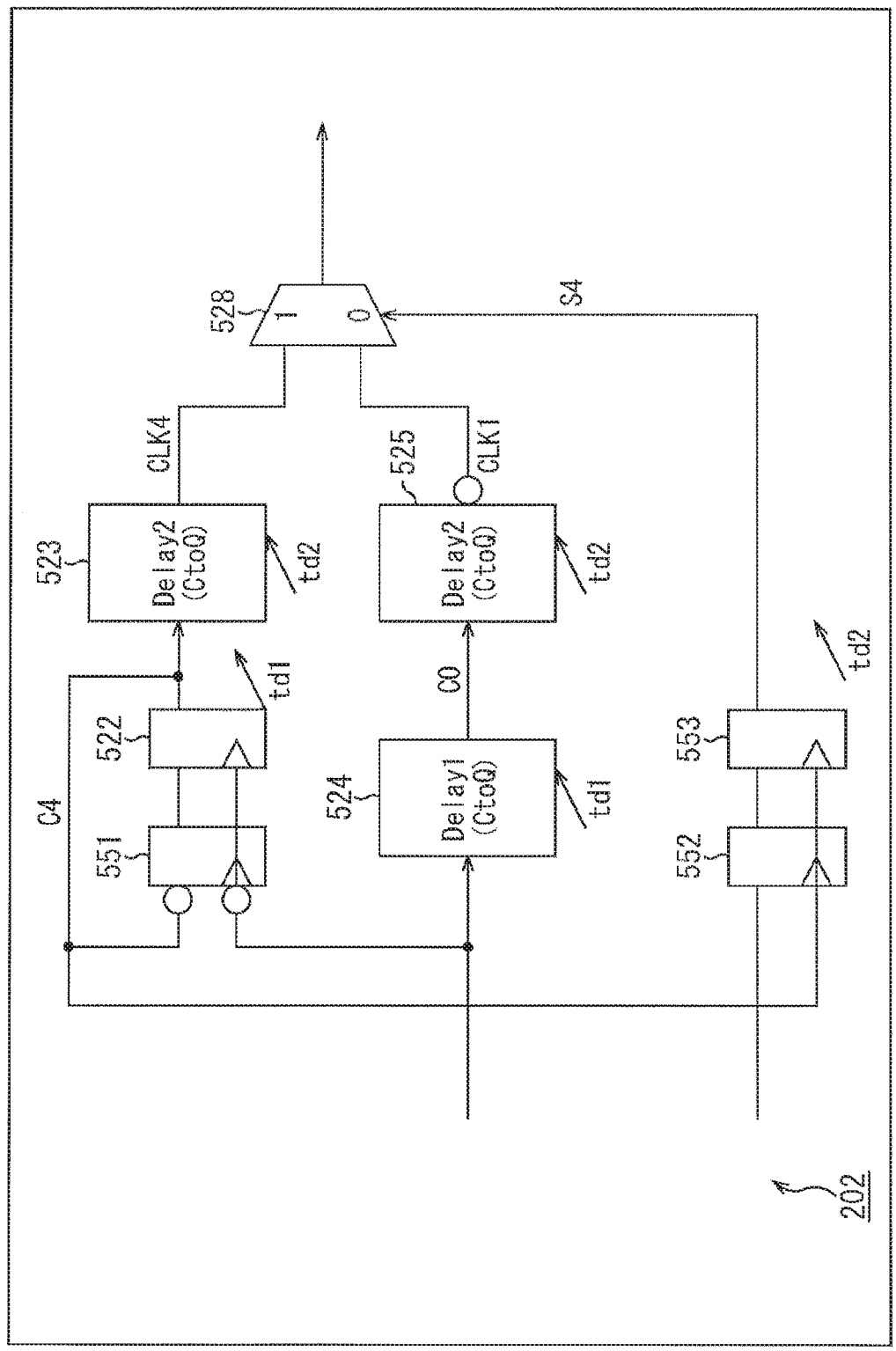
[FIG. 21]

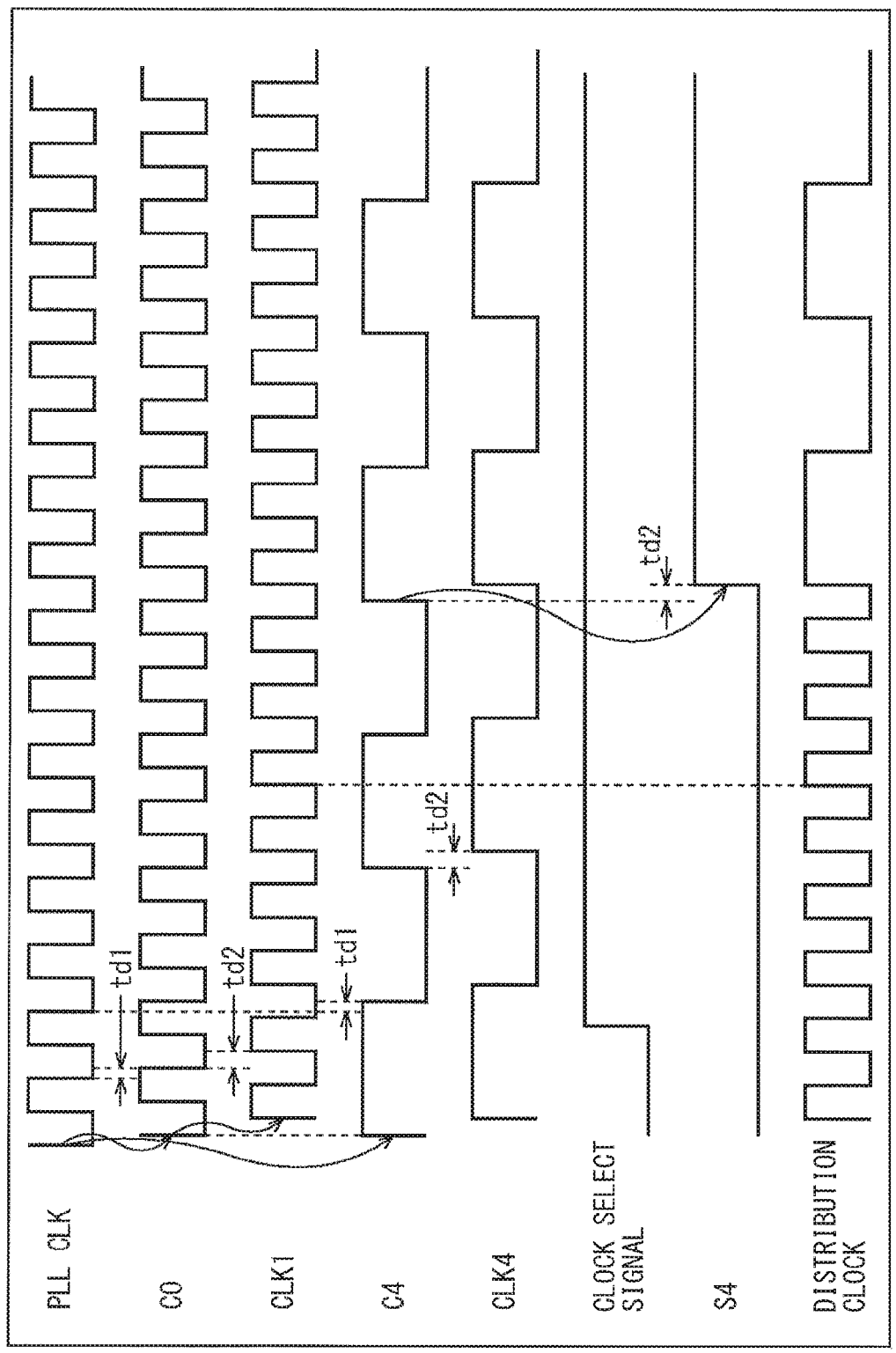
[FIG. 22]

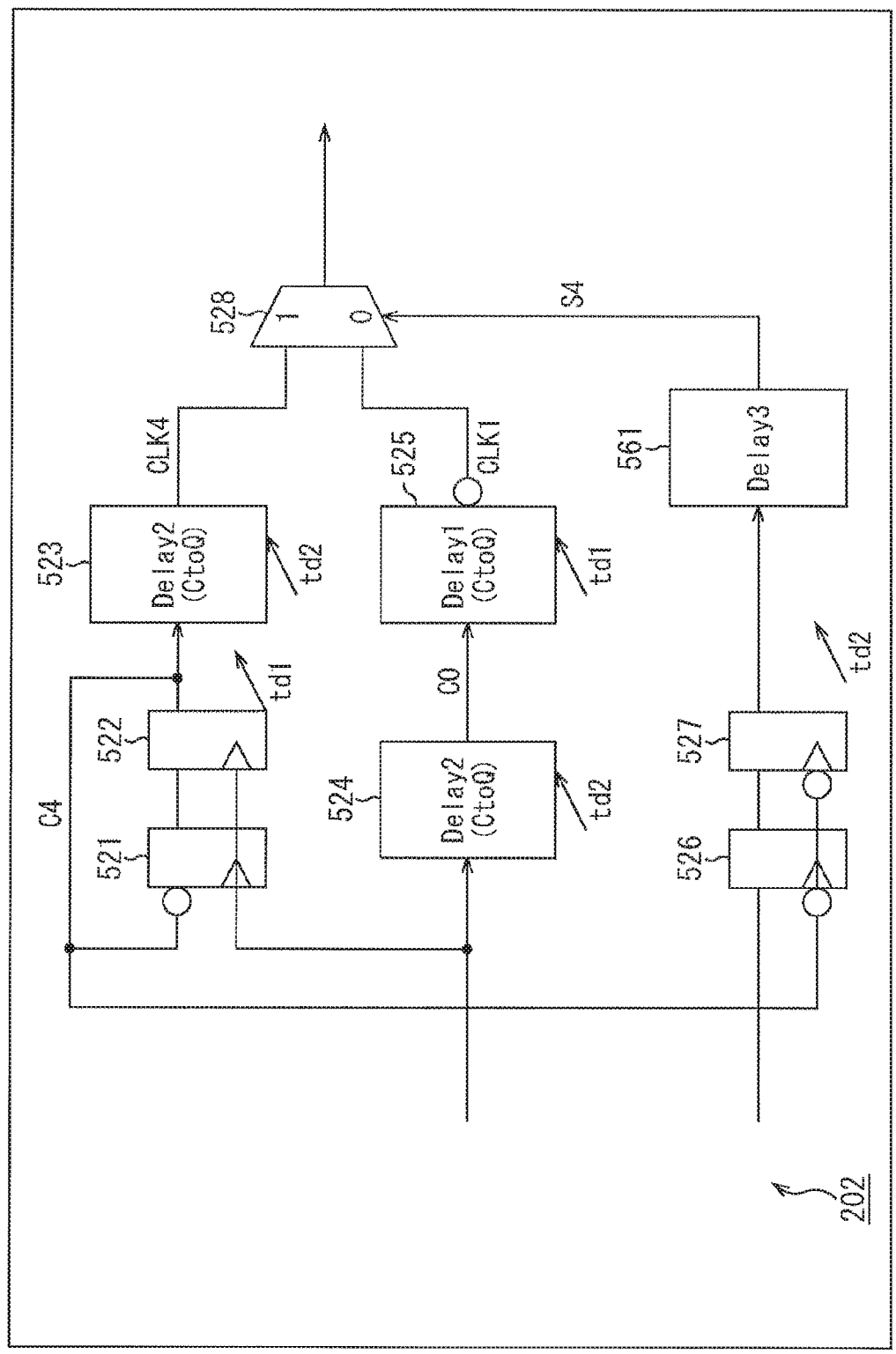
[FIG. 23]

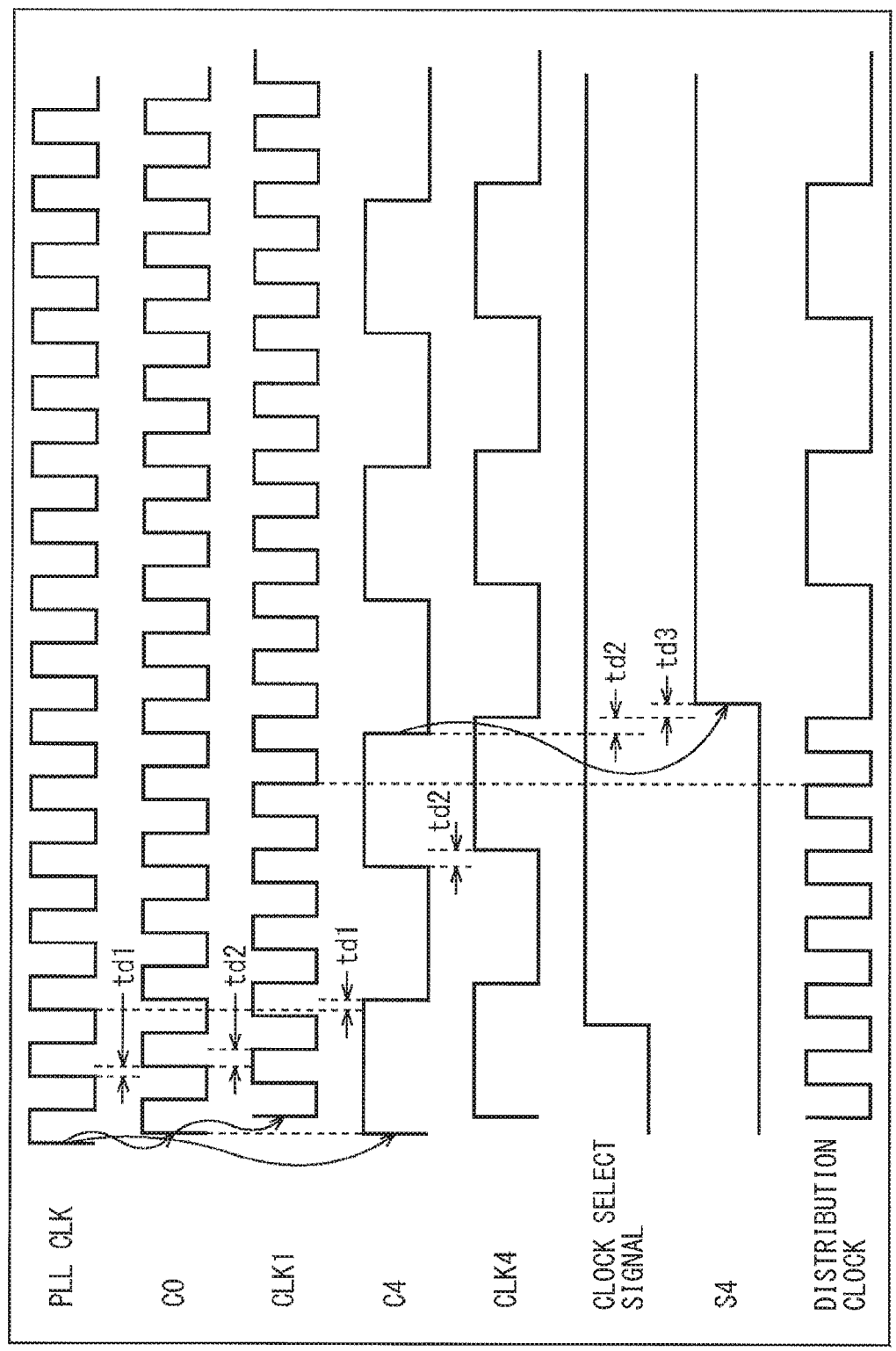
[FIG. 24]

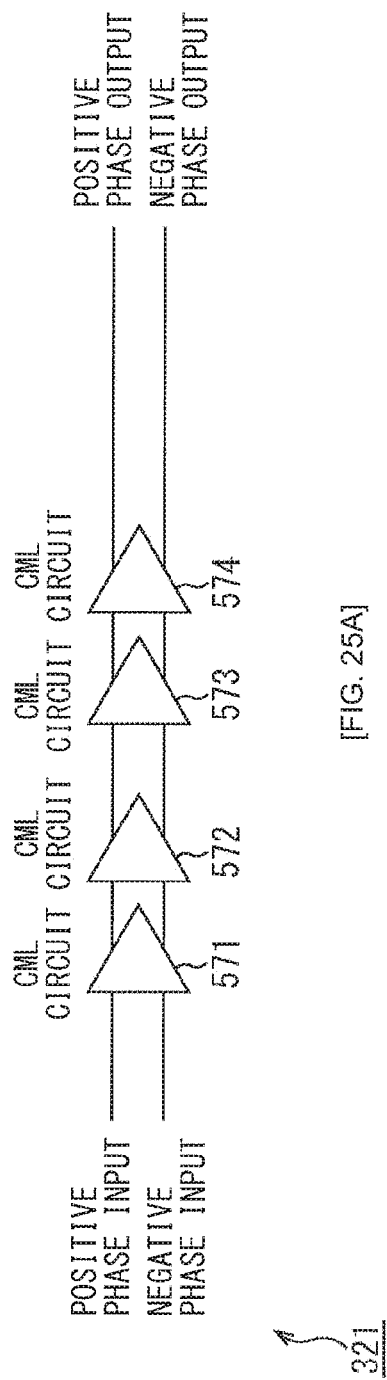
[FIG. 25A]
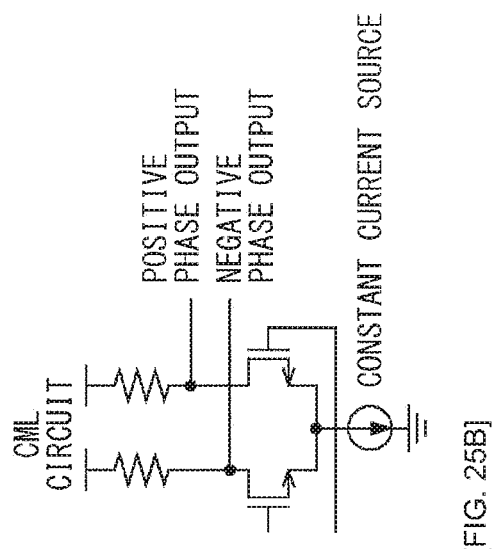
[FIG. 25B]

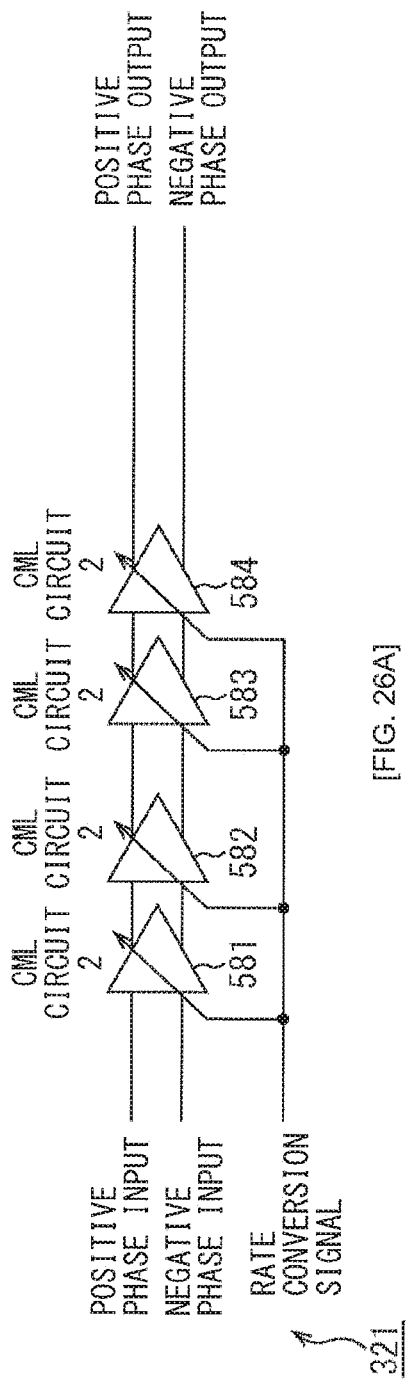
[FIG. 26A]
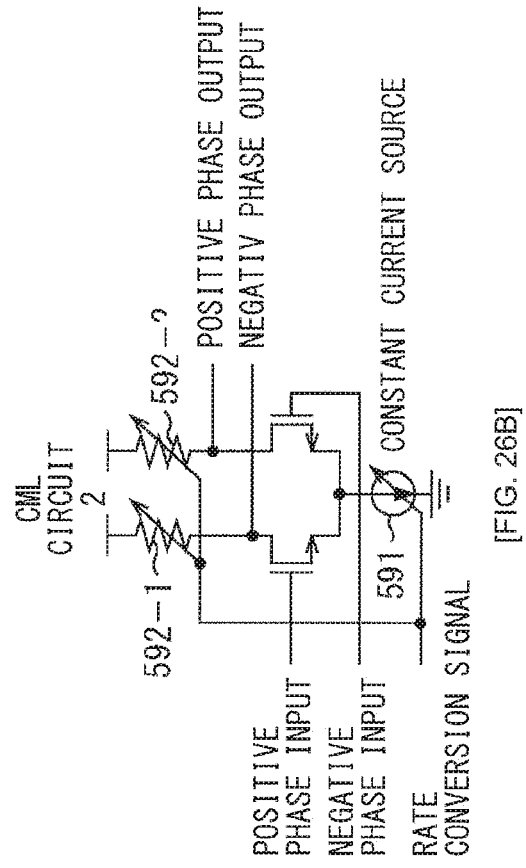
[FIG. 26B]

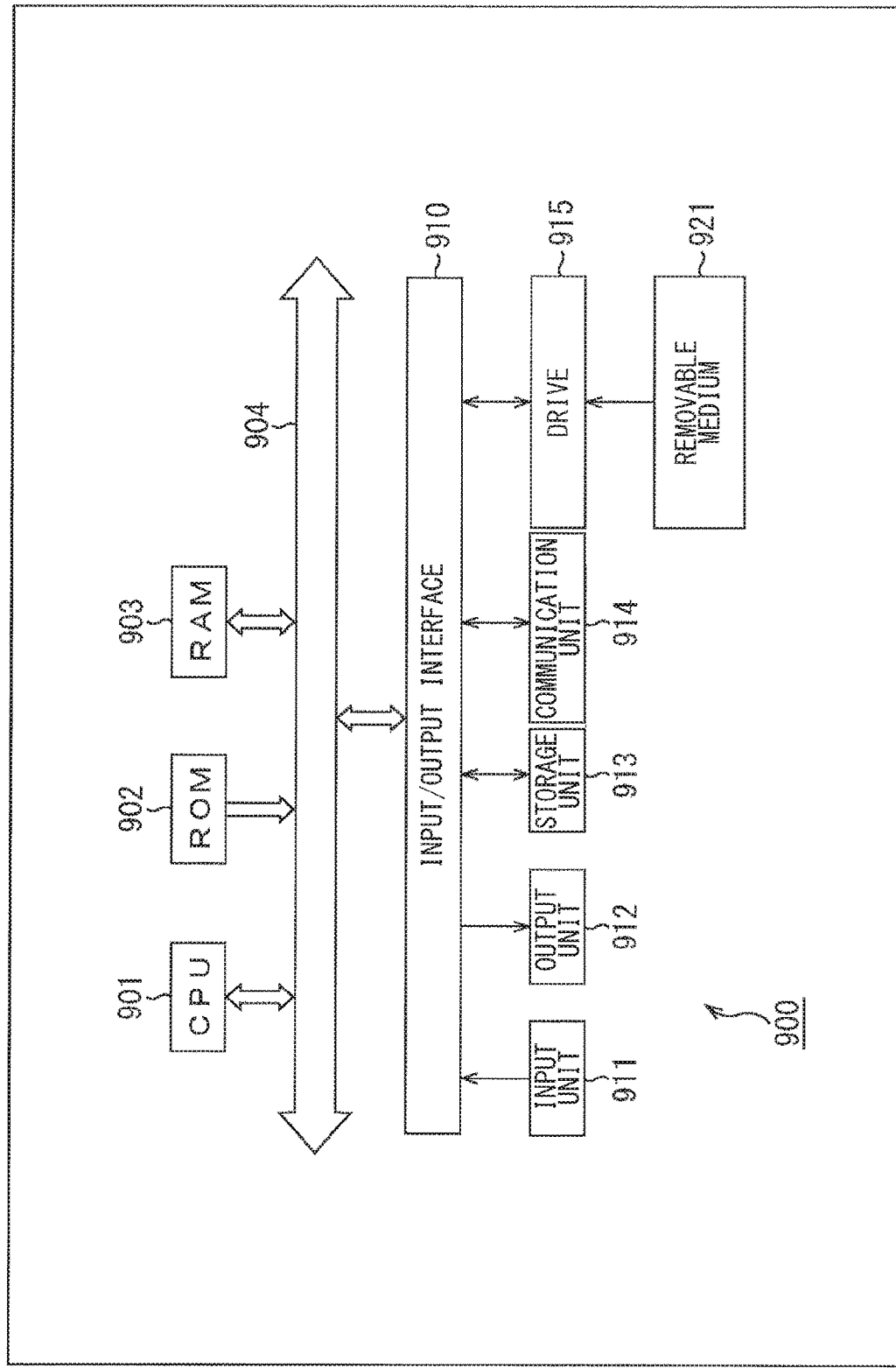
[FIG. 27]

TRANSMITTER AND TRANSMISSION METHOD AND RECEIVER AND RECEPTION METHOD

CROSS REFERENCE TO RELATED APPLICATIONS

This application is a U.S. National Phase of International Patent Application No. PCT/JP2018/023226 filed on Jun. 19, 2018, which claims priority benefit of Japanese Patent Application No. JP 2017-130347 filed in the Japan Patent Office on Jul. 3, 2017. Each of the above-referenced applications is hereby incorporated herein by reference in its entirety.

TECHNICAL FIELD

The present disclosure relates to a transmitter and a transmission method and a receiver and a reception method, and particularly relates to a transmitter and a transmission method and a receiver and a reception method that make it possible to suppress an increase in power consumption.

BACKGROUND ART

In recent years, a high-speed interface that enables transmission and reception of a signal at, for example, several Gbps, and makes it possible to achieve low power consumption has been desired. To meet such a demand, for example, standardization including C-PHY standard and D-PHY standard created by MIPI (Mobile Industry Processor Interface) alliance has been pursued (e.g., refer to PTL 1).

In the D-PHY, a clock is transferred separately from data. In contrast, in the C-PHY, three lines are used to embed clock information in data for transfer. Further, there is also a technique of using two lines to embed clock information in data for transfer.

CITATION LIST

Patent Literature

PTL 1: Japanese Unexamined Patent Application Publication (Published Japanese Translation of PCT Application) No. JP2014-522204

SUMMARY OF THE INVENTION

Problems to be Solved by the Invention

In serial transfer of thus embedding clock information in data, it has been necessary to continue transferring data constantly to maintain synchronization of a clock data recovery (CDR (Clock Data Recovery)) circuit on receiving side. For this reason, it has been required to continue transferring data, also during a period in which data transfer is unnecessary, and there has been a possibility that electric power of a system may be unnecessarily increased.

The present disclosure has been made in view of such a circumstance, and makes it possible to suppress an increase in power consumption.

Means for Solving the Problem

A transmitter according to an aspect of the present technology includes a transmission unit that transmits data in which a clock signal is embedded, and a clock control section that controls a frequency of the clock signal embedded in the data to reduce the frequency of the clock signal in a predetermined period.

A transmission method according to an aspect of the present technology includes transmitting data in which a clock signal is embedded, and controlling a frequency of the clock signal embedded in the data to reduce the frequency of the clock signal in a predetermined period.

A receiver according to another aspect of the present technology includes a reception unit that receives data in which a clock signal is embedded and a notification indicating that a frequency of the clock signal is variable, and a signal processing unit that reduces a frequency of the data received by the reception unit in a predetermined period, on the basis of the notification received by the reception unit.

A reception method according to another aspect of the present technology includes receiving data in which a clock signal is embedded and a notification indicating that a frequency of the clock signal is variable, and reducing a frequency of the received data in a predetermined period, on the basis of the received notification.

In the transmitter and the transmission method according the aspects of the present technology, the data in which the clock signal is embedded is transmitted, and the frequency of the clock signal embedded in the data is controlled to reduce the frequency of the clock signal in the predetermined period.

In the receiver and the reception method according to the other aspects of the present technology, the data in which the clock signal is embedded and the notification indicating that the frequency of the clock signal is variable are received, and the frequency of the received data is reduced in the predetermined period, on the basis of the received notification.

Effects of the Invention

According to the present disclosure, it is possible to process information. In particular, it is possible to suppress an increase in power consumption.

BRIEF DESCRIPTION OF DRAWINGS

FIG. 1 is a block diagram illustrating a main configuration example of a data transfer system.

FIG. 2 is a block diagram illustrating a main configuration example of a transmitter.

FIG. 3 is a block diagram illustrating a main configuration example of a transmission PLL.

FIG. 4 is a block diagram illustrating a main configuration example of a receiver.

FIG. 5 is a block diagram illustrating a main configuration example of an analog front end.

FIGS. 6A, 6B, and 6C are circuit diagrams illustrating a configuration example of respective components of the analog front end.

FIG. 7 is a flowchart that describes an example of a flow of transmission control processing.

FIG. 8 illustrates a configuration example of image data.

FIG. 9 describes an example of a state of clock control.

FIG. 10 is a flowchart that describes an example of a flow of reception processing.

FIG. 11 describes an example of a state of driving.

FIG. 12 describes an example of a state of driving.

FIG. 13 describes an example of a state of fluctuation in power consumption.

FIG. 14 illustrates an example of a state of fluctuation in power consumption depending on the proportion of a blank period.

FIG. 15 is a block diagram illustrating a main configuration example of a transmission PLL.

FIG. 16 describes an example of a state of clock control.

FIG. 17 is a block diagram illustrating a main configuration example of a distribution clock generation section.

FIG. 18 describes an example of a state of clock control.

FIG. 19 describes an example of a state of clock control.

FIG. 20 is a block diagram illustrating a main configuration example of a distribution clock generation section.

FIG. 21 is a block diagram illustrating a main configuration example of a distribution clock generation section.

FIG. 22 describes an example of a state of clock control.

FIG. 23 is a block diagram illustrating a main configuration example of a distribution clock generation section.

FIG. 24 describes an example of a state of clock control.

FIGS. 25A and 25B are block diagrams illustrating a main configuration example of an analog front end.

FIGS. 26A and 26B are block diagrams is a block diagram illustrating a main configuration example of an analog front end.

FIG. 27 is a block diagram illustrating a main configuration example of a computer.

MODES FOR CARRYING OUT THE INVENTION

In the following, description is given of modes for carrying out the present disclosure (hereinafter referred to as embodiments). It is to be noted that the description is given in the following order.
1. Serial Data Transfer
2. First Embodiment (Data Transfer System and Clock Control)
3. Second Embodiment (Transmission PLL)
4. Third Embodiment (Analog Front End)
5. Others

1. Serial Data Transfer

In recent years, a high-speed interface that enables transmission and reception of a signal at, for example, several Gbps, and makes it possible to achieve low power consumption has been desired. To meet such a demand, for example, standardization including C-PHY standard and D-PHY standard created by MIPI (Mobile Industry Processor Interface) alliance has been pursued.

In the D-PHY, a clock is transferred separately from data. In contrast, in the C-PHY, three lines are used to embed clock information for transfer. Further, there is also a technique of using two lines to embed clock information in data for transfer.

In serial transfer of thus embedding clock information in data, it has been necessary to continue transferring data constantly to maintain synchronization of a clock data recovery (CDR (Clock Data Recovery)) circuit on receiving side. For this reason, it has been required to continue transferring data, also during a period in which data transfer is unnecessary, and there has been a possibility that electric power of a system may be unnecessarily increased.

For example, in a case of transferring image data, blanking data is also transmitted other than the image data; it is necessary to continue sending transmission data from a transmission device to a reception device in this section as well, and there has been a possibility that a load on a system may be unnecessarily increased to increase power consumption unnecessarily.

2. First Embodiment

<Control of Clock Upon Transmission>

In view of such a circumstance, data in which a clock signal is embedded is transmitted on transmission side, and at that time, a frequency of the clock signal embedded in the data is controlled to reduce the frequency of the clock signal in a predetermined period. This makes it possible to reduce the frequency of a clock signal in a transmission unit, etc. in a period in which data transfer is unnecessary, thereby making it possible to reduce a load on a system. Hence, it is possible to suppress an increase in power consumption.

<Control of Frequency of Reception Data>

Further, data in which a clock signal is embedded and a notification indicating that the frequency of the clock signal is variable are received on receiving side, and the frequency of the received data is reduced in a predetermined period, on the basis of the received notification. This makes it possible to properly receive transmitted data in which the frequency of a clock is reduced. In other words, it is possible to enable data transfer, also in the period in which the frequency of the clock signal is reduced on the transmission side as described above. This makes it possible to perform data transfer more efficiently and thus to transmit more information.

<Data Transfer System>

FIG. 1 illustrates an example of an embodiment of a data transfer system to which the present technology is applied. A data transfer system 100 illustrated in FIG. 1 is a system that transfers information from a transmitter 101 to a receiver 102. The transmitter 101 and the receiver 102 are coupled to each other by a predetermined transfer path 103 to enable communication therebetween.

The transmitter 101 is a device that transmits information to the receiver 102 via the transfer path 103. For example, image data is inputted to the transmitter 101 from a processing unit, etc. in the previous stage. The transmitter 101 transmits the image data to the receiver 102 via the transfer path 103. The receiver 102 is a device that receives the information transmitted from the transmitter 101 via the transfer path 103. For example, the image data transmitted from the transmitter 101 is supplied to the receiver 102 via the transfer path 103. The receiver 102 receives the image data, and outputs the received image data to, for example, a processing unit, etc. in the subsequent stage.

The transfer path 103 forms a transfer path of wired or wireless type or of both the types, by any communication medium. For example, this transfer path 103 may include a communication cable of a predetermined standard, or may include a network such as a local area network, the Internet, and the like. Further, a portion or the whole of the transfer path 103 may be achieved by wireless communication.

The transmitter 101 and the receiver 102 exchange data via this transfer path 103. At that time, the transmitter 101 and the receiver 102 each transfer the data as a serial signal. Further, at that time, the transmitter 101 and the receiver 102 each embed clock information in the data to be transferred.

<Transmitter>

FIG. 2 is a block diagram illustrating a main configuration example of the transmitter 101 in FIG. 1. As illustrated in FIG. 2, the transmitter 101 includes a control unit 111 and a transmission unit 112. The control unit 111 performs control over transmission of information. For example, transmission target data (an arrow 151-1 to an arrow 151-4) and clocks (an arrow 152-1 to an arrow 152-4) corresponding to the data are supplied to the control unit 111 from outside of the transmitter 101. The transmission target data (the arrow 151-1 to the arrow 151-4) are each supplied as a parallel signal in which a plurality of bits are transferred in parallel. Further, the clock is embedded in the transmission target data. Furthermore, a general-purpose reference clock (an arrow 153) is also supplied to the control unit 111 from the outside of the transmitter 101. Moreover, clocks (an arrow 155-1 to an arrow 155-4) are supplied to the control unit 111 also from the transmission unit 112 (a parallel-serial converter 141 of a lane-specific transmission section 132 described later).

The control unit 111 supplies supplied transmission target data (arrow 154-1 to arrow 154-4) to the transmission unit 112. At that time, the control unit 111 controls the frequency of the clock embedded in the transmission target data. The control unit 111 performs various kinds of processing for the control.

For example, the control unit 111 has functions indicated by processing sections such as a data analysis section 121, a switching information supply section 122, and a clock control section 123.

The data analysis section 121 performs processing regarding analysis of the transmission target data. For example, the data analysis section 121 analyzes the transmission target data externally supplied as indicated by the arrow 151-1 to the arrow 151-4, and grasps a data structure, etc. thereof. For example, the data analysis section 121 may analyze header information, a payload, etc. and thereby directly grasp the data structure, etc., or may analyze the type of the data (e.g., whether or not the data is image data, etc.) and thereby indirectly grasp the data structure, etc. For example, when the data is data in conformity with some standard, it is possible for the data analysis section 121 to grasp the data structure on the basis of the standard, by grasping what the standard is.

The switching information supply section 122 performs processing regarding supply of switching information that notifies whether or not to control the frequency of a clock signal embedded in the transmission target data to make this frequency variable, etc. For example, the switching information supply section 122 decides a manner in which the frequency of the clock signal is controlled, on the basis of the result of the analysis of the data (information such as the type of the data and the structure of the data) performed by the data analysis section 121. For example, the switching information supply section 122 decides whether the frequency of the clock signal is made variable or fixed, and what frequency is used in what period in a case where the frequency is made variable, etc.

Further, the switching information supply section 122 generates the switching information including information about the control method thus decided. Furthermore, before starting to control the frequency of the clock signal, the switching information supply section 122 supplies the generated switching information to the transmission unit 112 as the data (the arrow 154-1 to the arrow 154-4), and the supplied data is transmitted. This enables the receiver 102 to easily grasp beforehand a reduction in the frequency of the clock in a period specified by the switching information. This enables the receiver 102 to respond appropriately coinciding with the period, and receive the information properly.

The clock control section 123 controls the frequency of the clock signal embedded in the data. For example, the clock control section 123 supplies a control signal (an arrow 156) and a reference clock (an arrow 157) to the transmission unit 112 to thereby cause the transmission unit 112 to set the post-control frequency of the clock embedded in the data. For example, the clock control section 123 performs control to reduce the frequency of the clock signal in a predetermined period. For example, the clock control section 123 generates this control signal, in accordance with a control method decided by the switching information supply section 122.

Further, upon acquiring each of the clocks (the arrow 155-1 to the arrow 155-4) of the frequency from the transmission unit 112, the clock control section 123 synchronizes the clocks (the arrow 152-1 to the arrow 152-4) to the acquired respective clocks. In addition, the clock control section 123 synchronizes the transmission target data (the arrow 151-1 to the arrow 151-4) to the respective clocks (the arrow 155-1 to the arrow 155-4). This causes the frequencies of the clocks of the transmission target data (the arrow 151-1 to the arrow 151-4) to be the frequencies of the clocks (the arrow 155-1 to the arrow 155-4), i.e., the frequencies set by the transmission unit 112. The clock control section 123 supplies the transmission target data (the arrow 154-1 to the arrow 154-4) after the frequency control to the transmission unit 112. It is to be noted that the transmission target data (the arrow 154-1 to the arrow 154-4) after this frequency control are each also a parallel signal.

It is to be noted that a specific configuration of the control unit 111 is arbitrary. For example, the control unit 111 may be formed by a dedicated electronic circuit, etc. corresponding to processing to be executed, or may include, for example, a CPU (Central Processing Unit), a ROM (Read Only Memory), a RAM (Random Access Memory), etc., and the CPU, etc. may achieve any processing by executing a program, etc.

The transmission unit 112 performs processing regarding transmission of information. For example, the transmission unit 112 transmits the transmission target data in which the clock signal is embedded.

In the transmission unit 112, lanes (Lane) having configurations independent of one another are formed, and it is possible for the transmission unit 112 to transmit data from these lanes. For example, in the case in FIG. 2, the transmission unit 112 includes a lane-specific transmission section 132-1 to a lane-specific transmission section 132-4. The lane-specific transmission section 132-1 to the lane-specific transmission section 132-4 have configurations independent of one another, and each perform processing regarding transmission of data. In other words, four lanes are formed in the transmission unit 112.

Incidentally, the transfer path 103 also corresponds to the lanes of this transmission unit 112, and includes a transfer path for each of the lanes. For example, in the case in FIG. 2, the transfer path 103 includes transfer paths (a transfer path 103-1 to a transfer path 103-4) for the respective four lanes. Each of these transfer paths is able to perform data transfer independently of the data transfers of other transfer paths. The lane-specific transmission section 132-1 to the lane-specific transmission section 132-4 transmit data to the transfer path 103-1 to the transfer path 103-4, respectively (i.e., the transfer paths assigned to themselves). It is to be noted that this transfer path for each of the lanes may be achieved by a physical configuration, or may be virtually achieved by time division, frequency division, etc.

The lane-specific transmission section 132-1 to the lane-specific transmission section 132-4 have configurations similar to each other. In the following, in a case where it is not necessary to describe the lane-specific transmission section 132-1 to the lane-specific transmission section 132-4 as sections distinguished from one another, these are each referred to as the lane-specific transmission section 132. In other words, the lane-specific transmission section 132 is a transmission section provided for and dedicated to each of the above-described lanes.

The lane-specific transmission section 132-1 performs processing regarding transmission of data in a lane 1 (Lane1). For example, the data (the arrow 154-1) for the lane 1 is supplied from the control unit 111 to the lane-specific transmission section 132-1. The lane-specific transmission section 132-1 generates data for transmission using the data, and transmits the generated data to the transfer path 103-1 for the lane 1. For example, the lane-specific transmission section 132-1 converts the transmission target data that is a parallel signal into a serial signal having bits to be sequentially transmitted one by one in the lane 1, and transmits the converted data.

The lane-specific transmission section 132-1 includes a parallel-serial converter (P/S) 141-1 and a driver (DRV) 142-1. The parallel-serial converter 141-1 converts the transmission target data of a parallel signal into a serial signal, and supplies the converted data to the driver 142-1 as the data for transmission (an arrow 159-1). Further, the parallel-serial converter 141-1 divides a distribution clock (an arrow 158) supplied from a transmission PLL 131 described later via an amplifier section 133 at a predetermined division ratio, and supplies the divided clock (the arrow 155-1) to the control unit 111. The driver 142-1 amplifies the data for transmission at a predetermined amplification factor, and transmits the amplified data.

The lane-specific transmission section 132-2 (not illustrated) has a configuration basically similar to that of the lane-specific transmission section 132-1, and performs similar processing to thereby perform processing regarding transmission of data in a lane 2 (Lane2). The lane-specific transmission section 132-3 (not illustrated) has a configuration basically similar to that of the lane-specific transmission section 132-1, and performs similar processing to thereby perform processing regarding transmission of data in a lane 3 (Lane3). The lane-specific transmission section 132-4 has a configuration basically similar to that of the lane-specific transmission section 132-4, and performs similar processing to thereby perform processing regarding transmission of data in a lane 4 (Lane4).

In other words, the lane-specific transmission section 132-2 includes a parallel-serial converter 141-2 and a driver 142-2 (neither illustrated); the lane-specific transmission section 132-3 includes a parallel-serial converter 141-3 and a driver 142-3 (neither illustrated); and the lane-specific transmission section 132-4 includes a parallel-serial converter (P/S) 141-4 and a driver (DRV) 142-4. In the following, in a case where it is not necessary to describe the parallel-serial converter (P/S) 141-1 to the parallel-serial converter (P/S) 141-4 as converters distinguished from one another, these are each referred to as the parallel-serial converter (P/S) 141. In addition, in a case where it is not necessary to describe the driver (DRV) 142-1 to the driver (DRV) 142-4 as drivers distinguished from one another, these are each referred to as the driver (DRV) 142.

The transmission unit 112 further includes the transmission PLL (Phase Locked Loop) (TXPLL) 131 and an amplifier section 133-1 to an amplifier section 133-4.

The transmission PLL 131 performs processing regarding supply of a clock signal (the distribution clock) to the parallel-serial converter 141 of each of the lanes. For example, the transmission PLL 131 generates the distribution clock. For example, the transmission PLL 131 generates the distribution clock, in accordance with the control of the clock control section 123. For example, the reference clock (the arrow 157) and the control signal (the arrow 156) are supplied from the control unit 111 to the transmission PLL 131. The transmission PLL 131 generates the distribution clock on the basis of those signals.

Although a method of generating this distribution clock is arbitrary, for example, the transmission PLL 131 generates a clock signal of a predetermined frequency on the basis of the reference clock, and further, the transmission PLL 131 generates a frequency division clock by dividing the generated clock signal, selects either of those signals as the distribution clock on the basis of the control signal, and supplies the distribution clock (the arrow 158) to the parallel-serial converter 141 of each of the lane-specific transmission sections 132. Each of the parallel-serial converters 141 embeds the distribution clock supplied from the transmission PLL 131 in the data supplied from the control unit 111, and generates the data for transmission.

The amplifier section 133-1 to the amplifier section 133-4 each amplify the distribution clock at a predetermined amplification factor. In the following, in a case where it is not necessary to describe the amplifier section 133-1 to the amplifier section 133-4 as sections distinguished from one another, these are each referred to as the amplifier section 133. In the case of the example in FIG. 2, the amplifier section 133 is provided for each of the lanes, but the number and the positions of the amplifier sections 133 to be provided are arbitrary. In addition, the amplification factor of each of the amplifier sections 133 is arbitrary, and the amplification factors of all the amplifier sections 133 may not necessarily be uniform.

In the transmitter 101 having the above-described configuration, for example, the clock control section 123 performs control to reduce the frequency of the distribution clock in the predetermined period. For example, the clock control section 123 reduces the frequency of the distribution clock to a predetermined frequency in the predetermined period (divided at a predetermined division ratio). The frequency (the division ratio) after this change is arbitrary. For example, the frequency may be a quarter (a division ratio of 4) of the original frequency.

When the frequency of the distribution clock is reduced, the frequency of the clock supplied from the parallel-serial converter 141 to the control unit 111 is also reduced. Further, the clock control section 123 synchronizes the transmission target data to the clock, and thus the frequency of the clock embedded in the transmission target data is also reduced. In other words, a transfer rate is reduced.

Reducing the transfer rate (the frequency of the clock signal embedded in the data) in this manner enables the transmitter 101 to suppress an increase in the power consumption of the system (the transmitter 101, the receiver 102, etc.).

In addition, operating in the manner described above enables the transmitter 101 to reduce the transfer rate (the frequency of the clock signal embedded in the data) without releasing locking of a PLL 201, a clock data recovery 322, etc. described later. This enables the transmitter 101 to perform restoration (returning to the original rate (frequency)) of the transfer rate (the frequency of the clock signal embedded in the data) at a high speed. For example, the restoration takes time when the locking is released, and thus, the transfer rate is reduced only in a short period. Reducing the transfer rate without releasing the locking as described above makes it possible to increase the period for reducing the transfer rate. In other words, it is possible to further suppress an increase in power consumption.

In other words, it is possible to suppress an increase in power consumption by reducing the transfer rate, in a shorter period as well. This enables the transmitter 101 to suppress an increase in power consumption, in any length of period. This enables the transmitter 101 to reduce the transfer rate, for example, in a period in which data transfer is not important (e.g., a period in which data transfer is unnecessary, a period in which the transfer amount of useful data is small, etc.). In the other words, in a period in which data transfer is important (e.g., a period in which the transfer amount of useful data is large, etc.), it is possible to suppress a reduction in transfer rate. It is therefore possible for the transmitter 101 to suppress an increase in power consumption, while suppressing a reduction in transfer rate for useful data.

It is to be noted that, in the case of the example in FIG. 2, four lanes are provided in the transmission unit 112, but the number of these lanes is arbitrary. The number may be three or less or may be five or more. Further, the control unit 111 may be formed outside the transmitter 101. For example, the control unit 111 may be formed as a device independent of the transmitter 101.

<Transmission PLL>

FIG. 3 is a block diagram illustrating a main configuration example of the transmission PLL 131 in FIG. 2. As illustrated in FIG. 3, the transmission PLL 131 includes, for example, the PLL 201 and a distribution clock generation section 202.

The PLL 201 generates a clock signal (a PLL output clock) of a predetermined frequency, on the basis of the reference clock (the arrow 156). The distribution clock generation section 202 generates the distribution clock (the arrow 158), on the basis of the PLL output clock and the control signal (the arrow 157).

The PLL 201 includes a phase frequency comparator (PFD (Phase Frequency Detector)) 211, a charge pump (CP (Charge Pump)) 212, a low pass filter (LPF (Low Pass Filter)) 213, a voltage controlled oscillator (VCO (Voltage Contorolled Oscillator)) 214, and a frequency divider 215.

The phase frequency comparator 211 includes a circuit that converts a phase difference between two inputted signals into a voltage and outputs the voltage, and the phase frequency comparator 211 compares the phase of the reference clock supplied from the control unit 111 and the phase of a signal supplied from the frequency divider 215, converts a phase difference therebetween into a voltage, and supplies the voltage to the charge pump 212 (an arrow 231). The charge pump 212 increases the voltage of a phase comparison result (the voltage corresponding to the phase difference) supplied from the phase frequency comparison section 211. The charge pump 212 supplies the phase comparison result having the increased voltage to the low pass filter 213.

The low pass filter 213 converts the inputted phase difference comparison result into a direct current voltage, by applying a filter that passes a low frequency component. The low pass filter 213 supplies the direct current voltage to the voltage controlled oscillator 214. The voltage controlled oscillator 214 includes a circuit that is able to control an output frequency on the basis of an inputted voltage, generates a signal of a frequency corresponding to the voltage supplied from the low pass filter 213, and supplies the generated signal to the frequency divider 215 as a feedback signal (an arrow 234).

The frequency divider 215 divides the feedback signal at a predetermined division ratio. The frequency divider 215 supplies the divided feedback signal to the phase frequency comparator 211 (an arrow 235). In other words, the phase frequency comparator 211 compares the phase of the reference clock and the phase of the divided feedback signal.

Further, the voltage controlled oscillator 214 supplies the generated signal (the feedback signal) also to the distribution clock generation section 202 as the PLL output clock. The direct current voltage to be supplied to the voltage controlled oscillator 214 is the result of the phase comparison performed by the phase frequency comparator 211, i.e., a voltage corresponding to the phase difference between the reference clock and the divided feedback signal. In other words, the PLL output clock is a signal determined by multiplying the reference clock.

The distribution clock generation section 202 generates the distribution clock to be supplied to each of the lane-specific transmission sections 132, using this PLL output clock. For example, the distribution clock generation section 202 generates the distribution clock by selecting any one of a plurality of signals of different frequencies including a frequency division clock signal resulting from division of the PLL output clock.

For example, the distribution clock generation section 202 includes a frequency divider 221 and a selection portion 222. The PLL output clock outputted from the PLL 201 is supplied to the frequency divider 221 (an arrow 237). The frequency divider 221 divides the PLL output clock at a predetermined division ratio. This division ratio is arbitrary. For example, the division ratio may be 4 (i.e., the frequency divider 221 may reduce the frequency to a quarter). The frequency divider 221 supplies the divided PLL output clock to the selection portion 222 (an arrow 238). Further, the PLL output clock (the PLL output clock not divided) outputted from the PLL 201 is also supplied to the selection portion 222 (an arrow 236). Furthermore, the control signal (the arrow 157) is also supplied to the selection portion 222.

The selection portion 222 selects either one of the non-divided PLL output clock and the divided PLL output clock, depending on the control signal. For example, the selection portion 222 selects the non-divided PLL output clock supplied from the PLL 201 in a case where the value of the control signal is low (Low), and selects the divided PLL output clock supplied from the frequency divider 221 in a case where the value of the control signal of is high (High). Of course, this value is an example; it is arbitrary which signal is to be selected for what value of the control signal. The selection portion 222 supplies the selected signal to each of the lane-specific transmission sections 132 as the distribution clock (via the amplifier section 133).

Such a configuration enables the transmission PLL to switch the frequency of the distribution clock easily. In addition, it is possible for the clock control section 123 to control the frequency of the distribution clock easily, only by supplying the control signal that is binary (Low or High).

It is to be noted that the configuration of the distribution clock generation section 202 is arbitrary, and is not limited to the above-described example. For example, the distribution clock generation section 202 may select either one of the two PLL output clocks divided at division ratios different from each other. In that case, it is sufficient that respective frequency dividers having different division ratios are provided at both of two inputs of the selection portion 222, and the PLL output clocks are supplied to the selection portion 222 via those frequency dividers.

In addition, although the selection portion 222 is described above to select the distribution clock from two candidates, the selection portion 222 may select the distribution clock from three or more candidates. In that case, it is sufficient that the control signal includes information on bit number corresponding to the number of the candidates.

<Receiver>

FIG. 4 is a block diagram illustrating a main configuration example of the receiver 102 in FIG. 1. As illustrated in FIG. 4, the receiver 102 includes a reception unit 301 and an information processing unit 302. The reception unit 301 performs processing regarding reception of information. For example, the reception unit 301 receives the transmission data transmitted from the transmitter 101 via the transfer path 103 (the transfer path 103-1 to the transfer path 103-4), and extracts the transmission target data and the clock corresponding to the data, from the transmission data. The reception unit 301 supplies the extracted transmission target data (an arrow 344-1 to an arrow 344-4) and the clocks (an arrow 345-1 to an arrow 345-1) corresponding to the data to the information processing unit 302. The information processing unit 302 performs predetermined processing on the information supplied from the reception unit 301, and outputs the information after the processing to outside of the receiver 102.

As with the transmission unit 112, lanes (Lane) having configurations independent of one another are formed in the reception unit 301 as well, and it is possible for the reception unit 301 to receive data for each of these lanes. For example, in the case in FIG. 4, the reception unit 301 includes a lane-specific reception section 311-1 to a lane-specific reception section 311-4. The lane-specific reception section 311-1 to the lane-specific reception section 311-4 have configurations independent of one another, and each perform processing regarding reception of data. In other words, four lanes are formed in the reception unit 301.

The lane-specific reception section 311-1 to the lane-specific reception section 311-4 have configurations similar to each other. In the following, in a case where it is not necessary to describe the lane-specific reception section 311-1 to the lane-specific reception section 311-4 as sections distinguished from one another, these are each referred to as the lane-specific reception section 311. In other words, the lane-specific reception section 311 is a reception section provided for and dedicated to each of the above-described lanes.

The lane-specific reception section 311-1 performs processing regarding reception of data in the lane 1 (Lane1). For example, the lane-specific reception section 311-1 receives the transmission data for the lane 1 transmitted via the transfer path 103-1. The lane-specific reception section 311-1 extracts the data (the transmission target data) and the clock corresponding to the data, from the transmission data. The lane-specific reception section 311-1 supplies the extracted data (the arrow 344-1) and a clock (the arrow 345-1) to the information processing unit 302.

The lane-specific reception section 311-1 includes an analog front end (AFE (Analog Front End)) 321-1, a clock data recovery (CDR (Clock Data Recovery)) 322-1, and a serial-parallel converter (S/P) 323-1.

The analog front end 321-1 performs processing regarding reception of the transmission data (an analog signal). For example, the analog front end 321-1 detects the transmission data (the analog signal), and performs signal processing such as amplification of the detected transmission data (the analog signal). The analog front end 321-1 supplies the transmission data (the analog signal) after the signal processing to the clock data recovery 322-1 (an arrow 341-1).

The clock data recovery 322-1 extracts the clock signal embedded in the transmission data. In the other words, the clock data recovery 322-1 extracts the data (the transmission target data) from the transmission data. The clock data recovery 322-1 supplies the extracted data (an arrow 342-1) and a clock (343-1) to the serial-parallel converter 323-1.

The serial-parallel converter 323-1 converts the supplied data (the arrow 342-1) of a serial signal into a parallel signal, and supplies the parallel signal to the information processing unit 302 (the arrow 344-1). Further, the serial-parallel converter 323-1 supplies the supplied clock (the arrow 343-1) to the information processing unit 302 as the clock (the arrow 345-1) corresponding to the data (the arrow 344-1).

The lane-specific reception section 311-2 (not illustrated) has a configuration basically similar to that of the lane-specific reception section 311-1, and performs similar processing to perform processing regarding reception of data in a lane 2 (Lane2). The lane-specific reception section 311-3 (not illustrated) has a configuration basically similar to that of the lane-specific reception section 311-1, and performs similar processing to perform processing regarding reception of data in a lane 3 (Lane3). The lane-specific reception section 311-4 has a configuration basically similar to that of the lane-specific reception section 311-4, and performs similar processing to perform processing regarding reception of data in a lane 4 (Lane4).

In other words, the lane-specific reception section 311-2 includes an analog front end 321-2, a clock data recovery 322-2, and a serial-parallel converter 323-2 (neither illustrated); the lane-specific reception section 311-3 includes an analog front end 321-3, a clock data recovery 322-3, and a serial-parallel converter 323-3 (neither illustrated); and the lane-specific reception section 311-4 includes an analog front end 321-4, a clock data recovery 322-4, and a serial-parallel converter 323-4. In the following, in a case where it is not necessary to describe the analog front end 321-1 to the analog front end 321-4 as ends distinguished from one another, these are each referred to as the analog front end 321. Further, in a case where it is not necessary to describe the clock data recovery 322-1 to the clock data recovery 322-4 as recoveries distinguished from one another, these are each referred to as the clock data recovery 322. Furthermore, in a case where it is not necessary to describe the serial-parallel converter 323-1 to the serial-parallel converter 323-4 as converters distinguished from one another, these are each referred to as the serial-parallel converter 323.

The reception unit 301 receives, for example, the switching information transmitted as the data. In processing such data received by the reception unit 301, for example, the information processing unit 302 reduces the frequency of the data received by the reception unit 301 in a predetermined period, on the basis of the switching information received by the reception unit 301.

For example, the information processing unit 302 has functions indicated by processing sections such as a switching information acquisition section 331, a data thinning section 332, an image processing section 333, and a clock control section 334.

The switching information acquisition section 331 performs processing regarding acquisition of the switching information to be transmitted from the transmitter 101. For example, the switching information acquisition section 331 controls the reception unit 301 to acquire the switching information transmitted as the data. Further, for example, the switching information acquisition section 331 grasps a control method for the frequency of the clock signal to be embedded in the transmission data, on the basis of the acquired switching information. For example, the switching information acquisition section 331 grasps whether the frequency of the clock signal is made variable or fixed, what type of frequency is used in what period in a case where the frequency is made variable, etc.

The data thinning section 332 performs processing regarding thinning of the data (the arrow 344-1 to the arrow 344-4) received by the reception unit 301. For example, in a case where the frequency of the clock signal to be embedded in the transmission data is reduced to a quarter and the transfer rate becomes a quarter, data of "0101" is restored by the clock data recovery 322 to data four times the transfer rate as in "0000111100001111". The data thinning section 332 thins out this data to obtain "0101". This enables the image processing section 333 to also appropriately process data in a desirable period in which the frequency of the clock signal is reduced. This makes it possible to transfer useful data (possible to perform data transfer except for the transfer of unnecessary dummy data) in this period as well. In other words, it is possible to increase a period in which the useful data is transferable and thus to suppress a reduction in transfer rate (a data transfer amount per unit time).

It is to be noted that the data thinning section 332 performs data thinning, on the basis of the switching information (the control method indicated by the switching information) acquired by the switching information acquisition section 331. In other words, the data thinning section 332 performs the data thinning depending on how the frequency of the clock signal is reduced in which period. It is therefore possible to perform the data thinning by an appropriate method (it is possible to restore a state before a change in rate).

In a case where the received data is image data, the image processing section 333 performs image processing on the image data. The content of this image processing is arbitrary. For example, in a case where the data thinning section 332 performs the data thinning, the image processing section 333 performs the image processing on the image data resulting from this data thinning. The image processing section 333 outputs data (an arrow 346) after the image processing and a clock signal (an arrow 347) corresponding to the data to outside of the receiver 102. It is to be noted that this data to be outputted is a parallel signal.

The clock control section 334 controls the frequency of a clock signal that controls driving of the information processing unit 302. For example, the clock control section 334 controls the frequency of the clock signal, on the basis of the switching information (the control method indicated by the switching information) acquired by the switching information acquisition section 331. In other words, the clock control section 334 controls a driving speed of the information processing unit 302, depending on the frequency control for the clock signal embedded in the transmission data.

For example, in a case where the frequency of the clock signal to be embedded in the transmission data is reduced to a quarter and the transfer rate becomes a quarter, data of "0101" is restored by the clock data recovery 322 to data four times the transfer rate as in "0000111100001111". It is possible for the clock control section 334 to cause the image processing section 333 to process the data as "0101", by reducing the frequency of the clock signal to a quarter and by bringing the driving speed of the information processing unit 302 to a quarter. This enables the image processing section 333 to also appropriately process data in a desirable period in which the frequency of the clock signal is reduced. This makes it possible to transmit useful data (possible to perform data transfer except for the transfer of unnecessary dummy data) in this period as well. In other words, it is possible to increase a period in which the useful data is transferable and thus to suppress a reduction in transfer rate (a data transfer amount per unit time) of the useful data.

In other words, it is possible for the information processing unit 302 to enable the image processing section 333 to appropriately perform the image processing, by causing the data thinning section 332 to perform data thinning, or causing the clock control section 334 to reduce the driving speed.

It is to be noted that, in such a period in which the frequency of the clock signal is reduced, the image processing section 333 may mask reception data not to perform processing. This makes it possible to avoid a code error that occurs due to an error in transfer rate. In other words, in this case, it is possible to enable the image processing section 333 to perform the image processing appropriately, without the necessity of the data thinning and the clock control.

It is to be noted that a specific configuration of the information processing unit 302 is arbitrary. For example, the information processing unit 302 may be formed by a dedicated electronic circuit, etc. corresponding to processing to be executed, or may include, for example, a CPU, a ROM, a RAM, etc., and the CPU, etc. may achieve any processing by executing a program, etc.

It is to be noted that, in the case of the example in FIG. 4, four lanes are provided in the reception unit 301, but the number of these lanes is arbitrary. The number may be three or less or may be five or more. Further, the information processing unit 302 may be formed outside the receiver 102. For example, the information processing unit 302 may be formed as a device independent of the receiver 102.

<Analog Front End>

FIG. 5 is a block diagram illustrating a main configuration example of the analog front end 321 in FIG. 4. As illustrated in FIG. 5, the analog front end 321 includes, for example, a differential amplifier portion 361, a differential amplifier portion 362, a CMLCMOS (Current Mode Logic Complementary Metal Oxide Semiconductor) conversion circuit 363, an inverter 364-1, an inverter 364-2, an inverter 365-1, and an inverter 365-2.

The differential amplifier portion 361 and the differential amplifier portion 362 are each configured by, for example, a CML (Current Mode Logic) circuit such as a circuit illustrated in FIG. 6A, and each amplify an inputted analog signal (a differential signal) and output the amplified signal. The analog signal (the differential signal) amplified by each of the differential amplifier portion 361 and the differential amplifier portion 362 is supplied to the CMLCMOS conversion circuit 363.

The CMLCMOS conversion circuit 363 is configured by, for example, a differential amplification circuit that is a CML circuit and an inverter circuit that is a CMOS circuit, such as circuits illustrated in FIG. 6C.

The inverter 364-1 and the inverter 364-2 are each configured by, for example, an inverter circuit of a CMOS (Complementary Metal Oxide Semiconductor) circuit such as a circuit illustrated in FIG. 6B, and invert the value of an output of the CMLCMOS conversion circuit 363. It is to be noted that the inverter 364-1 inverts the value of a positive phase output, and the inverter 364-2 inverts the value of a negative phase output.

Similarly, the inverter 365-1 is configured by, for example, an inverter circuit of a CMOS circuit such as the circuit illustrated in FIG. 6B, and inverts the value of an output of the inverter 364-1. The inverter 365-2 is configured by, for example, an inverter circuit of a CMOS circuit such as the circuit illustrated in FIG. 6B, and inverts the value of an output of the inverter 364-2. An output of the inverter 365-1 is supplied to the clock data recovery 322 as a positive phase output. Further, an output of the inverter 365-2 is supplied to the clock data recovery 322 as a negative phase output.

It is to be noted that, in the following, in a case where it is not necessary to describe the inverter 364-1 and the inverter 364-2 as inverters distinguished from each other, these are each referred to as the inverter 364. In addition, in a case where it is not necessary to describe the inverter 365-1 and the inverter 365-2 as inverters distinguished from each other, these are each referred to as the inverter 365.

In general, the CMOS circuit feeds a current only during operation, and thus power consumption is reduced in response to a decrease in an input signal. In other words, the transmitter 101 reduces the frequency of the clock signal embedded in the transmission data, thereby making it possible to reduce the power consumption of the analog front end 321.

It is to be noted that, in the analog front end 321 in the example in FIG. 5, the differential amplification circuits of the CML circuits are formed in three stages including the CMLCMOS conversion circuit 363, and the inverter circuits of the CMOS circuits are used in three stages including the CMLCMOS conversion circuit 363. However, this is an example, and the number of the stages for each of the CML circuit and the CMOS circuit is not limited to this example. It is possible to decide the number of the stages for each of the CML circuit and the CMOS circuit, depending on, for example, an input amplitude, a capacity in a subsequent stage, etc.

<Flow of Transmission Control Processing>

Next, description is given of processing to be executed by the data transfer system 100. In a case where data transfer is performed, the control unit 111 of the transmitter 101 performs transmission control processing and thereby controls transmission of data performed by the transmission unit 112. An example of a flow of the transmission control processing is described with reference to a flowchart in FIG. 7.

When the transmission control processing is started, the data analysis section 121 analyzes the transmission target data supplied from the outside of the transmitter 101 in step S101. In the following, description is given of a case where the transmission target data is image data (a moving image) as an example.

FIG. 8 describes an example of a state of transfer of an image data for one frame of the moving image. For example, as illustrated in FIG. 8, a transmission period 400 for one frame of the moving image includes a frame image data period 401 in which image data for one frame is to be transferred, a synchronization period 402 in which a horizontal synchronization signal (Hsync), a vertical synchronization signal (Vsync), etc. are to be transferred, and a blank period 403 in which a blank signal is to be transferred.

The synchronization period 402 in which the horizontal synchronization signal (Hsync) is to be transferred is provided for each of rows of the frame image data period 401, and the synchronization period 402 in which the vertical synchronization signal (Vsync) is to be transferred is provided for each of frames. Further, the blank period 403 is provided between the rows of the frame image data period 401, and provided before and after the frame image data period 401 (i.e., between the frames).

In this case, the blank period 403 is a period in which the image data is not transferred (the period in which data transfer is not important), and thus the control unit 111 reduces the frequency of the clock signal embedded in the data to, for example, a quarter. For example, the control unit 111 assumes the frequency of the distribution clock to be 10 GHz and the transfer rate to be 10 Gbps in the frame image data period 401, and the frequency of the distribution clock to be 2.5 GHz and the transfer rate to be 2.5 Gbps in the blank period 403. This makes it possible to suppress an increase in the power consumption of the transmitter 101 and the receiver 102, while suppressing a reduction in transfer rate for useful data.

For example, the control unit 111 switches the frequency in the manner described above in accordance with the horizontal synchronization signal (Hsync) and the vertical synchronization signal (Vsync) (i.e., the synchronization period 402). This makes is possible to more accurately suppress an increase in power consumption in the period in which data transfer is not important. In other words, it is possible to more accurately suppress a reduction in transfer rate in the period in which data transfer is important.

Referring back to FIG. 7, when it is grasped that the transmission target data is such image data, the processing proceeds to step S102.

In step S102, the switching information supply section 122 generates the switching information for such image data, and supplies the generated switching information to the transmission unit 112 to cause the transmission unit 112 to transmit the switching information. For example, as described above, the switching information supply section 122 assumes the frequency of the distribution clock to be 10 GHz and the transfer rate to be 10 Gbps in the frame image data period 401, and the frequency of the distribution clock to be 2.5 GHz and the transfer rate to be 2.5 Gbps in the blank period 403, and generates the switching information that indicates switching of the frequency coinciding with the horizontal synchronization signal (Hsync) and the vertical synchronization signal (Vsync) (i.e., the synchronization period 402). The transmission unit 112 transmits such switching information toward the receiver 102 via the transfer path 103.

In addition, the control unit 111 performs the following processing, in accordance with the control method indicated in this switching information. In other words, in step S103, in accordance with the horizontal synchronization signal (Hsync), the clock control section 123 supplies the control signal (a clock select signal) of the value (e.g., L (Low)) for selection of the PLL output clock (10 GHz) to the transmission PLL 131 (the selection portion 222 thereof) as the distribution clock, and thereby the transfer rate is switched to 10 Gbps. Further, the clock control section 123 transmits the image data for one line at the rate of 10 Gbps.

To be more specific, the transmission PLL 131 outputs the distribution clock of 10 GHz, in accordance with the control of the clock control section 123. The distribution clock is supplied to the control unit 111 via the parallel-serial converter 141. The clock control section 123 synchronizes data for transfer and a clock corresponding to the data to the clock of 10 GHz, converts the frequency of a clock embedded in the data for transfer into 10 GHz, and supplies the resulting data to the transmission unit 112 to cause the transmission unit 112 to transmit the data at the rate of 10 Gbps. The image data for one line is transferred at such a rate.

FIG. 9 illustrates an example of a waveform of each of the PLL output clock, the frequency division clock, the clock select signal, and the distribution clock in the transmission PLL 131 (FIG. 3). As illustrated in a first stage and a second stage from the top in FIG. 9, the PLL output clock repeats High (H) and Low (L) at a frequency four times that of the frequency division clock. As illustrated in a third stage and a fourth stage from the top in FIG. 9A, the PLL output clock is selected as the distribution clock, in a case where the clock select signal is Low (L).

The clock control section 123 therefore converts the frequency of the clock embedded in the transmission target data into 10 GHz, and transmits the image data for one line at the rate of 10 Gbps.

In step S104, in accordance with the horizontal synchronization signal (Hsync), the clock control section 123 supplies the control signal (the clock select signal) of the value (e.g., H (High)) for selection of the frequency division clock (the divided PLL output clock) (2.5 GHz) to the transmission PLL 131 (the selection portion 222 thereof) as the distribution clock, and thereby the transfer rate is switched to 2.5 Gbps. Further, the clock control section 123 transmits the blank signal in a horizontal blank period that is the blank period 403 until image data transmission for the next line, at the rate of 2.5 Gbps.

To be more specific, the transmission PLL 131 outputs the distribution clock of 2.5 GHz, in accordance with the control of the clock control section 123. The distribution clock is supplied to the control unit 111 via the parallel-serial converter 141. The clock control section 123 synchronizes the data for transfer and the clock corresponding to the data to the clock of 2.5 GHz, converts the frequency of the clock embedded in the data for transfer into 2.5 GHz, and supplies the resulting data to the transmission unit 112 to cause the transmission unit 112 to transmit the data at the rate of 2.5 Gbps. The blank signal for one horizontal blank period is transferred at such a rate.

As illustrated in the third stage and the fourth stage from the top in FIG. 9, the frequency division clock is selected as the distribution clock, in a case where the clock select signal is High (H).

The clock control section 123 therefore converts the frequency of the clock embedded in the transmission target data into 2.5 GHz, and transmits the blank signal for one horizontal blank period at the rate of 2.5 Gbps.

In step S105, the control unit 111 determines whether or not all the lines have been processed. In a case where a non-processed line is present in a processing target frame, the processing returns to step S103, in which the next non-processed line is set as a processing target line, and the processing in and after this step is repeated. In other words, for each of the lines of the image data, the control unit 111 performs the data transfer in the frame image data period 401 at 10 Gbps, and performs the data transfer in the blank period 403 at 2.5 Gbps. The processing in step S103 to step S105 is thus repeated, and in a case where all the lines of the processing target frame are determined to have been processed in step S105, the processing proceeds to step S106.

In step S106, in accordance with the vertical synchronization signal (Vsync), the clock control section 123 supplies the control signal (the clock select signal) of the value (e.g., H (High)) for selection of the frequency division clock (the divided PLL output clock) (2.5 GHz) to the transmission PLL 131 (the selection portion 222 thereof) as the distribution clock, and thereby the transfer rate is switched to 2.5 Gbps. Further, the clock control section 123 transmits the blank signal in a vertical blank period that is the blank period 403 until S image data transmission for the next frame at the rate of 2.5 Gbps.

To be more specific, the transmission PLL 131 outputs the distribution clock of 2.5 GHz, in accordance with the control of the clock control section 123. The distribution clock is supplied to the control unit 111 via the parallel-serial converter 141. The clock control section 123 synchronizes the data for transfer and the clock corresponding to the data to the clock of 2.5 GHz, converts the frequency of the clock embedded in the data for transfer into 2.5 GHz, and supplies the resulting data to the transmission unit 112 to cause the transmission unit 112 to transmit the data at the rate of 2.5 Gbps. The blank signal for one vertical blank period is transferred at such a rate.

As described above, the frequency division clock is selected as the distribution clock in a case where the clock select signal is High (H), and thus the clock control section 123 converts the frequency of the clock embedded in the transmission target data into 2.5 GHz, and transmits the blank signal for one vertical blank period at the rate of 2.5 Gbps.

In step S107, the control unit 111 determines whether or not to finish the transmission control processing. For example, in a case where a non-processed frame is present and the transmission control processing is determined to be continued, the processing returns to step S103, and the processing in and after this step is repeated. The processing in step S103 to step S107 is thus repeated, and in a case where all the frames are determined to have been processed in step S107, the transmission control processing is finished.

Executing the transmission control processing as described above enables the control unit 111 to suppress an increase in power consumption, while suppressing a reduction in transfer rate for useful data.

<Flow of Reception Processing>

For the data transmission described above, the information processing unit 302 of the receiver 102 performs reception processing, and performs information processing on the data received by the reception unit 301. An example of a flow of the reception processing is described with reference to a flowchart in FIG. 10.

When the reception processing is started, in step S201, the switching information acquisition section 331 of the information processing unit 302 acquires the switching information for image data received by the reception unit 301. This switching information for image data is the switching information transmitted from the transmitter 101 on the basis of the processing in step S102 (FIG. 7) of the transmission control processing.

The switching information acquisition section 331 performs the following processing, in accordance with the control method indicated in this switching information.

In step S202, the image processing section 333 acquires the image data for one line received by the reception unit 301. In step S203, the image processing section 333 processes the image data for one line, as the data for the transfer rate of 10 Gbps.

In step S204, the image processing section 333 acquires the data (the blank signal) of the horizontal blank period received by the reception unit 301. In step S205, the image processing section 333 processes the blank signal in the horizontal blank period, as the data for the transfer rate of 2.5 Gbps. For example, the data thinning section 332 brings the amount of data to a quarter by thinning out the blank signal, and the image processing section 333 processes the result, as the data for the transfer rate of 2.5 Gbps. Alternatively, for example, the clock control section 334 reduces the frequency of the clock to a quarter, and thereby the image processing section 333 processes the blank signal as the data for 2.5 Gbps.

In step S206, the image processing section 333 determines whether or not all the lines have been processed. In a case where a non-processed line is determined to be present in a processing target frame, the processing returns to step S202, in which the next non-processed line is set as a processing target line, and the processing in and after this step is repeated. In other words, for each of the lines of the image data, the image processing section 333 processes the data in the frame image data period 401 as the data for 10 Gbps, and processes the data in the blank period 403 as the data for 2.5 Gbps. The processing in step S202 to step S206 is thus repeated, and in a case where all the lines of the processing target frame are determined to have been processed in step S206, the processing proceeds to step S207.

In step S207, the image processing section 333 acquires the data (the blank signal) of the vertical blank period received by the reception unit 301. In step S208, the image processing section 333 processes the blank signal in the vertical blank period, as the data for the transfer rate of 2.5 Gbps. For example, the data thinning section 332 brings the amount of data to a quarter by thinning out the blank signal, and the image processing section 333 processes the result as the data for the transfer rate of 2.5 Gbps. Alternatively, for example, the clock control section 334 reduces the frequency of the clock to a quarter, and thereby the image processing section 333 processes the blank signal as the data for 2.5 Gbps.

In step S209, the image processing section 333 determines whether or not to finish the reception processing. For example, in a case where a non-processed frame is present and the reception processing is determined to be continued, the processing returns to step S202, and the processing in and after this step is repeated. The processing in step S202 to step S209 is thus repeated, and in a case where all the frames are determined to have been processed in step S209, the reception processing is finished.

Executing the reception processing as described above enables the information processing unit 302 to also appropriately process data in a desirable period in which the frequency of the clock signal is reduced, on the basis of the switching information (the control method indicated by the switching information). For example, useful data is transferable in this period as well, and thus it is possible to suppress a reduction in transfer rate for useful data. For example, utilizing the blank period makes is possible to transfer, for example, image data for a different purpose such as a thumbnail image, audio data, a command for control, etc. Of course, the data to be transferred in this period in which the frequency of the clock signal is reduced is arbitrary, and is not limited to these examples.

<State of Driving>

For example, in a case of transmitting the image data (10 Gbps) by performing the transmission control processing and the reception processing as described above, each of the processing sections of the transmitter 101 and each of the processing sections of the receiver 102 perform driving to transmit the data in all of which the clock signal of 10 GHz is embedded, at the rate of 10 Gbps, as illustrated in FIG. 11.

In contrast, in a case of transmitting the blank signal, etc. (2.5 Gbps), the lane-specific transmission section 132 and the amplifier section 133 of the transmitter 101 perform driving to transmit the data in which the clock signal of 2.5 GHz is embedded, at the rate of 2.5 bps, as indicated by gray in FIG. 12. This reduces the power consumption of the transmitter 101. In addition, the analog front end 321 of the receiver 102 also performs driving to process the data for the rate of 2.5 bps in which the clock signal of 2.5 GHz is embedded. This reduces the power consumption of the receiver 102 as well.

For this reason, for example, in a case of processing data of a moving image, the power consumption of the data transfer system 100 fluctuates, for example, as illustrated in FIG. 13. In other words, an increase in power consumption in the blank period is suppressed, as compared with power consumption during the transfer of image data for each frame. In this way, it is possible for the data transfer system 100 to suppress an increase in power consumption.

It is to be noted that, as illustrated in a graph in FIG. 14, the reduction amount (or the reduction rate) of power consumption depends on the length of the blank period. In the graph illustrated in FIG. 14, a solid line indicates an example of power consumption in a case where the transfer rate of 10 Gbps is maintained in all states, and a broken line indicates an example of power consumption depending on a blank rate (the proportion of the blank period) in a case where the transfer rate in the blank period is 2.5 Gbps. As illustrated in this graph, the reduction amount of power consumption is larger (the reduction rate is higher), as the blank rate is higher (i.e., as the blank period is longer).

In other words, it is possible to suppress an increase in the power consumption more significantly, as the period for reducing the frequency of the clock signal embedded in the data is longer. It is to be noted that it is possible to suppress an increase in the power consumption more significantly, as the reduction amount of the frequency of the clock signal embedded in the data is larger (the reduction rate is higher). Moreover, it is possible to suppress an increase in the power consumption more significantly, as the number of the lanes included in the transmitter 101 and the receiver 102 is larger.

Suppressing an increase in power consumption as described above makes it possible to, for example, reduce the amount of heat generation in each of the transmitter 101 and the receiver 102, thus making it easier to reduce the size of a housing. In addition, for example, in a case where the transmitter 101 or the receiver 102 is driven by using a battery as a power supply, it is possible to further increase a continuous operation time.

It is to be noted that the description has been given above of the case where the image data (the moving image) is transferred by way of example, but the transmission target (the reception target) data is not limited to this example, and may be any data or may have any type of structure.

It is to be noted that, in a case where the transmitter 101 and the receiver 102 each include the plurality of lanes as in the above-described example, the frequencies of the clock signals embedded in the data in the respective lanes may be controlled independently of one another for each lane. In other words, the frequency of the clock signal embedded in the data in each of the lanes may be uniform or may not be uniform in all of the lanes.

In a case of controlling the frequency for each of the lanes, the transmission PLL 131 may generate a dedicated distribution clock for each of the lanes and may supply the generated dedicated distribution clock to the lane-specific transmission section 132 of the lane. It is to be noted that, At that time, the distribution clock may be amplified by the amplifier section 133, as in the above-described example.

This makes it possible to suppress an increase in power consumption more adaptively.

3. Second Embodiment

<Transmission PLL>

The configuration example of the transmission PLL 131 is illustrated in FIG. 3, but the configuration of the transmission PLL 131 is not limited to this example. For example, the frequency division clock may be generated by using the frequency divider 215 of the PLL 201.

FIG. 15 is a block diagram illustrating a main configuration example of the transmission PLL 131 in that case. In the case of the example in FIG. 15, the transmission PLL 131 includes a distribution clock generation section 501, in place of the distribution clock generation section 202 in FIG. 3.

As illustrated in FIG. 15, the distribution clock generation section 501 does not include the frequency divider 221 (FIG. 3), and the selection portion 222 obtains the frequency division clock by utilizing the frequency divider 215. In other words, the selection portion 222 acquires the feedback signal divided by the frequency divider 215, as the frequency division clock (an arrow 502). Further, the selection portion 222 selects either one of the frequency division clock and the PLL output clock, depending on the value of the control signal (the clock select signal), and outputs the selected signal as the distribution clock.

This makes is possible to omit the frequency divider in the distribution clock generation section 501 as compared with the case in FIG. 3 and thus to more easily achieve a reduction in the size of a circuit in the transmitter 101. In addition, it is also possible to suppress an increase in power consumption.

<Distribution Clock Generation Section 2>

In the generation of the distribution clock, when a pulse width becomes small in switching the signal for selection as in a portion indicated by an arrow 511 in FIG. 16, an edge of output data becomes small, and thus there is a possibility that jitter may seem to have occurred on receiving side.

When large jitter is introduced in this manner, for example, there is a possibility that phase locking of the clock data recovery 322 of the receiver 102 is released to cause a reception error.

For this reason, the PLL output clock is delayed by a delay amount of the frequency divider, and is further delayed by a delay amount of a flip-flop provided to capture the clock select signal. This makes it possible to control the PLL output clock, the frequency division clock, and the timing for switching the clock select signal, and thus to suppress occurrence of jitter such as the one described above. It is therefore possible to suppress the release of the phase locking of the clock data recovery 322 of the receiver 102. This makes it possible not only to reduce time necessary for re-locking but also to operate the system stably.

FIG. 17 illustrates a main configuration example of the distribution clock generation section 202 in this case. In FIG. 17, the distribution clock generation section 202 includes a flip-flop 521, a flip-flop 522, a delay portion 523, a delay portion 524, a delay portion 525, a flip-flop 526, and a flip-flop 527, and a selection portion 528.

The flip-flop 521 and the flip-flop 522 serve as the frequency divider 221, and divide the PLL output clock (the arrow 236) (C4). The divided PLL output clock (the frequency division clock) is delayed by a delay amount td1 as compared with the state before the division.

The delay portion 523 delays the frequency division clock (C4) further by a delay amount td2 (CLK4). This delay amount td2 is a delay amount of a flip-flop provided to capture the clock select signal described later. The frequency division clock (CLK4) is inputted to the selection portion 528.

The delay portion 524 delays the PLL output clock (the arrow 236) by the delay amount td1 (C0). The delay portion 525 delays the PLL output clock (C0) further by the delay amount td2 (CLK1). The PLL output clock (CLK1) is inputted to the selection portion 528.

The flip-flop 526 and the flip-flop 527 capture the clock select signal (the arrow 157). The captured clock select signal (S4) is delayed by the delay amount td2 as compared with the state before the capture. This clock select signal (S4) is inputted to the selection portion 528 as the control signal.

The selection portion 528 selects the PLL output clock (CLK1) or the frequency division clock (CLK4), depending on the value of the clock select signal (S4). For example, in a case where the value of the clock select signal (S4) is "0" (L), the selection portion 528 selects the PLL output clock (CLK1). Further, for example, in a case where the value of the clock select signal (S4) is "1" (H), the selection portion 528 selects the frequency division clock (CLK4). The selection portion 528 supplies the selected signal to the lane-specific transmission section 132 (via the amplifier section 133), as the distribution clock (the arrow 158).

The PLL output clock (CLK1), the frequency division clock (CLK4), and the clock select signal (S4) are thereby delayed by the delay amount td2 with respect to the frequency division clock (C4). In other words, the PLL output clock (CLK1), the frequency division clock (CLK4), and the clock select signal (S4) are equal in timing.

FIG. 18 illustrates an example of a waveform of each of the signals in a case where the signal selected as the distribution clock switches from the PLL output clock (CLK1) to the frequency division clock (CLK4). As illustrated in FIG. 18, the PLL output clock (CLK1), the frequency division clock (CLK4), and the clock select signal (S4) are equal in timing, thus suppressing the occurrence of jitter in the distribution clock due to such switching of the value of the clock select signal. This makes it possible to suppress the release of locking.

FIG. 19 illustrates an example of a waveform of each of the signals in a case where the signal selected as the distribution clock switches from the frequency division clock (CLK4) to the PLL output clock (CLK1). In this case as well, the PLL output clock (CLK1), the frequency division clock (CLK4), and the clock select signal (S4) are equal in timing, thus suppressing the occurrence of jitter in the distribution clock due to such switching of the value of the clock select signal. This makes it possible to suppress the release of locking.

<Distribution Clock Generation Section 3>

It is to be noted that, as represented by an example in FIG. 20, the order of the delay portion 524 that delays the PLL output clock (the arrow 236) and the delay portion 525 may be reversed. In other words, the delay portion 525 may delay the PLL output clock, and then the delay portion 524 may further delay the PLL output clock. In this case as well, the PLL output clock (CLK1), the frequency division clock (CLK4), and the clock select signal (S4) are equal in timing, and thus the occurrence of jitter in the distribution clock due to such switching of the value of the clock select signal is suppressed. This makes it possible to suppress the release of locking.

<Distribution Clock Generation Section 4>

Further, in the case of the example in FIG. 17, the PLL output clock (CLK1) and the frequency division clock (CLK4) be both "0" (Law) at the switching timing of the clock select signal (S4). However, the PLL output clock (CLK1) and the frequency division clock (CLK4) may be both "1" (High) at this timing. FIG. 21 illustrates an example of a state of the distribution clock generation section 202 in that case. In the case of the example in FIG. 21, a flip-flop 551 is provided in place of the flip-flop 521. Further, a flip-flop 552 is provided in place of the flip-flop 526. Furthermore, a flip-flop 553 is provided in place of the flip-flop 527.

The logical negation of the PLL output clock is inputted to the flip-flop 551. Further, the distribution clock C4 is inputted to the flip-flop 552 and the flip-flop 553. Providing such a configuration enables the PLL output clock (CLK1) and the frequency division clock (CLK4) to be both "1" (High) at the switching timing of the clock select signal (S4), as illustrated in FIG. 22.

<Distribution Clock Generation Section 5>

Further, the captured clock select signal may be delayed further. As illustrated in FIG. 23, a delay portion 561 may be provided to delay the captured clock select signal by a delay amount td3.

This delays the clock select signal (S4) by the delay amount td3 with respect to the PLL output clock (CLK1) and the frequency division clock (CLK4), as illustrated in FIG. 24. Accordingly, a margin is obtained for the switching timing of the value of the clock select signal (S4). Accordingly, the occurrence of jitter in the distribution clock due to switching of the value of the clock select signal is further suppressed. This makes it possible to further suppress the release of locking.

It is to be noted the circuit configuration is described above as a single end configuration; however, it is also possible to use a differential configuration.

4. Third Embodiment

<Analog Front End 2>

The configuration example of the analog front end 321 is described with reference to FIG. 5, but a configuration example of the analog front end 321 is not limited to this example. For example, as illustrated in FIG. 25A, only the CML circuit may be used for the configuration. In the case of FIG. 25A, the analog front end 321 is configured by a differential amplifier portion 571 to a differential amplifier portion 574. The differential amplifier portion 571 to the differential amplifier portion 574 are each configured by a differential amplification circuit of a CML circuit such as a circuit illustrated in FIG. 25B.

<Analog Front End 3>

Further, for example, as illustrated in FIG. 26A, the analog front end 321 may be configured by a differential amplifier portion 581 to a differential amplifier portion 584. The differential amplifier portion 581 to the differential amplifier portion 584 are each configured by a differential amplification circuit of variable current type (FIG. 26B). In other words, the differential amplifier portion 581 to the differential amplifier portion 584 each include a current source 591 of variable current type, as well as a variable resistance 592-1 and a variable resistance 592-2, as illustrated in FIG. 26B.

The differential amplifier portion 581 to the differential amplifier portion 584 make it possible to reduce the current consumption, by doubling a resistance value to a half, or halving a current of the current source, etc., in a case where the rate is changed, by using, for example, a rate conversion signal. This makes is possible to suppress an increase in power consumption.

It is to be noted that, in the example in FIGS. 26A and 26B, the differential amplifier portion 581 to the differential amplifier portion 584 are described to the effect that all the differential amplifier portions are of variable current type, but this is not limitative; only some of the differential amplifier portions (the CML circuits) of the analog front end 321 may be of variable current type. Further, in the case of the example in FIG. 5, the differential amplifier portion 361 or the differential amplifier portion 362, or both of them may be of variable current type.

5. Others

<Software>

It is possible for the above-described series of steps of processing to be executed by hardware or to be executed by software. Further, it is also possible for a portion of the processing to be executed by hardware and another portion of the processing to be executed by software. In a case of executing the series of steps of processing by using software, a program that configures the software is installed in a computer. Here, examples of the computer include a computer incorporated into dedicated hardware, a computer being able to execute various functions by installing various programs, e.g., a general-purpose personal computer, etc.

FIG. 27 is a block diagram illustrating a configuration example of hardware of a computer that executes the above-described series of steps of processing by using a program.

In a computer 900 illustrated in FIG. 27, a CPU (Central Processing Unit) 901, a ROM (Read Only Memory) 902, and a RAM (Random Access Memory) 903 are coupled to one another by a bus 904.

An input/output interface 910 is also coupled to the bus 904. An input unit 911, an output unit 912, a storage unit 913, a communication unit 914, and a drive 915 are coupled to the input/output interface 910.

The input unit 911 includes, for example, a keyboard, a mouse, a microphone, a touch panel, an input terminal, etc. The output unit 912 includes, for example, a display, a speaker, an output terminal, etc. The storage unit 913 includes, for example, a hard disk, a RAM disk, a nonvolatile memory, etc. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads a program stored in, for example, the storage unit 913 into the RAM 903 via the input/output interface 910 and the bus 904, and executes the loaded program, thereby performing the above-described series of steps of processing. The RAM 903 also stores, as appropriate, data, etc. necessary for the CPU 901 to execute various kinds of processing.

It is possible to apply the program to be executed by the computer (the CPU 901) by, for example, recording the program in the removable medium 921 serving as a package medium. In that case, it is possible to install the program into the storage unit 913 via the input/output interface 910, by mounting the removable medium 921 on the drive 915. In addition, it is also possible to provide this program via a wired or wireless transfer medium such as a local area network, the Internet, and digital satellite broadcasting. In that case, it is possible to receive the program using the communication unit 914 and install the received program into the storage unit 913. Moreover, it is also possible to install this program into the ROM 902 or the storage unit 913 beforehand.

<Supplement>

Embodiments of the present technology are not limited to the above-described embodiments, and may be modified in a variety of ways within a scope not departing from the gist of the present technology.

For example, it is also possible to implement the present technology as any configuration that configures in a device or system, and examples of the configuration include a processor serving as a system LSI (Large Scale Integration), etc., a module using a plurality of processors, etc., a unit using a plurality of modules, etc., a set including a unit to which other additional functions are further added, and the like (i.e., a configuration of a portion of the device).

It is to be noted that, in the present specification, the system indicates a set of a plurality of components (a device, a module (a part), etc.), irrespective of whether or not all the components are present inside the same housing. For this reason, either of a plurality of devices contained in separate housings and coupled via a network, and one device containing a plurality of modules in a single housing, is the system.

Further, for example, the configuration described as one device (or processing unit) may be divided, and configured as a plurality of devices (or processing units). Conversely, the configurations described above as a plurality of devices (or processing units) may be collectively configured as one device (or processing unit). Further, a configuration other than those described above may of course be added to the configuration of each device (or each processing unit). Furthermore, when configurations and operations as an entire system are substantially the same, a portion of the configuration of a certain device (or processing unit) may be included in the configuration of another device (or another processing unit).

In addition, for example, the above-described program is executable in any device. In that case, it is sufficient for the device to have a necessary function (a function block, etc.) and to obtain necessary information.

Further, for example, each of the steps described with reference to the above flowcharts is executable by being shared by a plurality of devices, besides being executed by one device. Furthermore, in a case where a plurality of kinds of processing is included in one step, the plurality of kinds of processing included in the one step is executable by being shared by a plurality of devices, besides being executed by one device. In other words, the plurality of kinds of processing included in the one step is also executable as processing in a plurality of steps. Conversely, the processing described as the plurality of steps is also collectively executable as one step.

As for a program to be executed by a computer, processing of steps described by the program may be executed in time series in the order described in the present specification, or may be executed in parallel or at necessary timing when a call is made, etc. In other words, the processing of each of the steps may be executed in an order different from the above-described order unless a contradiction arises. Further, processing of each of the steps described in this program may be executed in parallel with processing of another program, or may be executed in combination with processing of another program.

A plurality of the present technologies described in the present specification is implementable independently of one another, unless a contradiction arises. Of course, it is also possible to implement any technologies of the plurality of the present technologies in combination. For example, a portion or the whole of the present technology described in any of the embodiments is also implementable in combination with a portion or the whole of the present technology described in another of the embodiments. Moreover, any portion or the whole of the present technology described above is also implementable together with another technology not described above.

It is to be noted that the present technology may also include the following configurations.

(1)

A transmitter including:

a transmission unit that transmits data in which a clock signal is embedded; and a clock control section that controls a frequency of the clock signal embedded in the data to reduce the frequency of the clock signal in a predetermined period.

(2)

The transmitter according to (1), further including:

a generation section that generates a signal of a predetermined frequency; and a selection portion that selects a signal from a plurality of signals of different frequencies including a frequency division clock signal resulting from division of the signal generated by the generation section, in which the clock control section controls the frequency of the clock signal by synchronizing the clock signal embedded in the data to the signal selected by the selection portion.

(3)

The transmitter according to (2), in which the selection portion includes a frequency divider that divides the signal.

(4)

The transmitter according to (3), in which the selection portion includes, a first delay portion that delays the signal by a delay amount of the frequency divider, and a second delay portion that delays the signal delayed by the first delay portion, by a delay amount of a flip-flop provided to capture a control signal from the clock control section.

(5)

The transmitter according to (4), in which the selection portion is configured to cause both of the signal and the frequency division clock signal to be High by the clock control section, at switching timing of selection made by the selection portion.

(6)

The transmitter according to (3), in which the selection portion includes a first delay portion that delays the signal by a delay amount of a flip-flop provided to capture a control signal from the clock control section, and a second delay portion that delays the signal delayed by the first delay portion, by a delay amount of the frequency divider.

(7)

The transmitter according to (6), in which the selection portion further includes a third delay portion that delays the control signal from the clock control section captured by the flip-flop.

(8)

The transmitter according to (2), in which the selection portion selects, as the clock signal, either one of the signal generated by the generation section and the frequency division clock signal resulting from division of the signal performed by a frequency divider included in the generation section.

(9)

The transmitter according to any one of (1) to (8), in which the clock control section brings the frequency of the clock signal to a quarter, in the predetermined period.

(10)

The transmitter according to any one of (1) to (9), in which the transmission unit transmits a notification indicating that the frequency of the clock signal is variable.

(11)

The transmitter according to any one of (1) to (10), in which the clock control section reduces the frequency of the clock signal during a horizontal blank period and a vertical blank period, in a case where the transmission unit transmits image data.

(12)

The transmitter according to (11), in which the clock control section switches the frequency of the clock signal in synchronization with a horizontal synchronization signal or a vertical synchronization signal.

(13)

The transmitter according to any one of (1) to (12), in which the transmission unit includes a plurality of components configured to transmit data independently of one another.

(14)

The transmitter according to (13), in which the clock control section controls the frequency of the clock signal for each of the components.

(15)

A transmission method including:
transmitting data in which a clock signal is embedded; and
controlling a frequency of the clock signal embedded in the data to reduce the frequency of the clock signal in a predetermined period.

(16)

A receiver including:
a reception unit that receives data in which a clock signal is embedded and a notification indicating that a frequency of the clock signal is variable; and
a signal processing unit that reduces a frequency of the data received by the reception unit in a predetermined period, on a basis of the notification received by the reception unit.

(17)

The receiver according to (16), in which the signal processing unit thins out the data received by the reception unit, in the predetermined period.

(18)

The receiver according to (16), in which the signal processing unit reduces a frequency of a clock signal that drives the signal processing unit, in the predetermined period.

(19)

The receiver according to any one of (16) to (18), in which the reception unit includes an analog front end that includes a CMOS circuit and processes an analog signal including the data in which the clock signal is embedded, and
a clock data recovery that separates the data and the clock signal form each other, by processing the analog signal processed by the analog front end.

(20)

A reception method including:
receiving data in which a clock signal is embedded and a notification indicating that a frequency of the clock signal is variable; and
reducing a frequency of the received data in a predetermined period, on a basis of the received notification.

EXPLANATION OF REFERENCE NUMERALS 100 data transfer system
101 transmitter
102 receiver
103 transfer path
111 control unit
112 transmission unit
121 data analysis section
122 switching information supply section
123 clock control section
131 transmission PLL
132 lane-specific transmission section
133 amplifier section
141 parallel-serial converter
142 driver
201 PLL
202 distribution clock generation section
211 phase frequency comparator
212 charge pump
213 low pass filter
214 voltage controlled oscillator
215 frequency divider
221 frequency divider
222 selection portion
301 reception unit
302 information processing unit
311 lane-specific reception section
321 analog front end
322 clock data recovery
323 serial-parallel converter
331 switching information acquisition section
332 data thinning section
333 image processing section
334 clock control section
361 and 362 differential amplifier portion
363 CMLCMOS conversion circuit
364 and 365 inverter
501 distribution clock generation section
521 and 522 flip-flop
523 to 525 delay portion
526 and 527 flip-flop
528 selection portion
551 to 553 flip-flop
561 delay portion
571 to 574 differential amplifier portion
581 to 584 differential amplifier portion
900 computer

The invention claimed is:

1. A transmitter, comprising:
a transmission unit configured to transmit data and switching information, wherein
the data includes a clock signal,
the switching information is based on a type of the data, and
the switching information includes first information and second information,
the first information indicates that a frequency of the clock signal is variable, and
the second information indicates that the frequency of the clock signal is a first frequency in a specific period; and
a clock control section configured to control the frequency of the clock signal to reduce the frequency of the clock signal to the first frequency in the specific period.

2. The transmitter according to claim 1, further comprising:
a generation section configured to generate a signal of a second frequency; and
a selection portion configured to select a specific signal from a plurality of signals, wherein each of the plurality of signals has a different frequency,
the plurality of signals includes a frequency division clock signal that results from division of the signal generated by the generation section, and
the clock control section is further configured to control the frequency of the clock signal based on synchronization of the clock signal with the specific signal selected by the selection portion.

3. The transmitter according to claim 2, wherein the selection portion includes a frequency divider configured to divide the signal.

4. The transmitter according to claim 3, wherein
the selection portion further includes:
a first delay portion configured to delay the signal by a delay amount of the frequency divider, and
a second delay portion configured to delay the signal delayed by the first delay portion, by a delay amount of a flip-flop provided to capture a control signal from the clock control section.

5. The transmitter according to claim 4, wherein, at a timing of the selection of the specific signal by the selection portion, the clock control section is further configured to set both of the specific signal and the frequency division clock signal at High.

6. The transmitter according to claim 3, wherein the selection portion includes:
a first delay portion configured to delay the signal by a delay amount of a flip-flop provided to capture a control signal from the clock control section, and
a second delay portion configured to delay the signal delayed by the first delay portion, by a delay amount of the frequency divider.

7. The transmitter according to claim 6, wherein the selection portion further includes a third delay portion configured to delay the control signal.

8. The transmitter according to claim 2, wherein
the generation section includes a frequency divider configured to divide the signal generated by the generation section to obtain the frequency division clock signal, and
the selection portion is further configured to select, as the clock signal, one of the signal generated by the generation section or the frequency division clock signal.

9. The transmitter according to claim 1, wherein the clock control section is further configured to reduce the frequency of the clock signal to a quarter, in the specific period.

10. The transmitter according to claim 1, wherein the clock control section is further configured to reduce the frequency of the clock signal during a horizontal blank period and a vertical blank period, based on transmission of image data by the transmission unit.

11. The transmitter according to claim 10, wherein the clock control section is further configured to switch the frequency of the clock signal in synchronization with one of a horizontal synchronization signal or a vertical synchronization signal.

12. The transmitter according to claim 1, wherein the transmission unit includes a plurality of components configured to transmit the data independently.

13. The transmitter according to claim 12, wherein the clock control section is further configured to control the frequency of the clock signal for each component of the plurality of components.

14. A transmission method, comprising:
transmitting data and switching information, wherein
the data includes a clock signal,
the switching information is based on a type of the data, and
the switching information includes first information and second information,
the first information indicates that a frequency of the clock signal is variable, and
the second information indicates that the frequency of the clock signal is a specific frequency in a specific period; and
controlling the frequency of the clock signal to reduce the frequency of the clock signal to the specific frequency in the specific period.

15. A receiver, comprising:
a reception unit configured to receive data and switching information, wherein
the data includes a clock signal,
the switching information is based on a type of the data, and
the switching information includes first information and second information,
the first information indicates that a frequency of the clock signal is variable, and
the second information indicates that the frequency of the clock signal is a specific frequency in a specific period; and
a signal processing unit configured to reduce the frequency of the data received by the reception unit to the specific frequency in the specific period, based on the switching information notification received by the reception unit.

16. The receiver according to claim 15, wherein the signal processing unit is further configured to thin out the data received by the reception unit, in the specific period.

17. The receiver according to claim 15, wherein the signal processing unit is further configured to reduce the frequency of the clock signal that drives the signal processing unit, in the specific period.

18. The receiver according to claim 15, wherein the reception unit includes:
an analog front end that includes a CMOS circuit, wherein the analog front end is configured to process an analog signal including the data; and
a clock data recovery configured to separate the clock signal from the data based on the processed.

19. A reception method, comprising:
receiving data and switching information, wherein
the data includes a clock signal,
the switching information is based on a type of the data, and
the switching information includes first information and second information,
the first information indicates that a frequency of the clock signal is variable, and
the second information indicates that the frequency of the clock signal is a specific frequency in a specific period; and
reducing the frequency of the received data to the specific frequency in the specific period, based on the received switching information.

* * * * *